United States Patent [19]

Bacon Cochrane et al.

[11] Patent Number: 6,074,549
[45] Date of Patent: Jun. 13, 2000

[54] JET PUMP TREATMENT OF HEAVY OIL PRODUCTION SAND

[75] Inventors: Diana L. Bacon Cochrane; Patrick J. Cochrane, both of Sherwood Park; Wade R. Bozak; Roderick M. Facey, both of Edmonton, all of Canada

[73] Assignee: Canadian Environmental Equipment & Engineering Technologies, Inc., Edmonton, Canada

[21] Appl. No.: 09/151,510

[22] Filed: Sep. 11, 1998

Related U.S. Application Data

[63] Continuation-in-part of application No. 09/026,761, Feb. 20, 1998.

[51] Int. Cl.[7] ..................................................... C10G 1/01
[52] U.S. Cl. ..................... 208/391; 208/390; 208/391; 210/705
[58] Field of Search ................................. 208/390, 391, 208/232; 210/705

[56] References Cited

U.S. PATENT DOCUMENTS

| | | | |
|---|---|---|---|
| 2,921,010 | 1/1960 | Sherborne | 208/11 |
| 2,924,565 | 2/1960 | Stegemier et al. | 208/11 |
| 2,980,600 | 4/1961 | Kelly | 208/11 |
| 3,041,267 | 6/1962 | Frame et al. | 208/11 |
| 3,271,293 | 9/1966 | Clark | 208/11 |
| 3,338,814 | 8/1967 | Givev et al. | 208/11 |
| 3,723,300 | 3/1973 | Garcia . | |
| 3,764,008 | 10/1973 | Darley et al. . | |
| 3,954,415 | 5/1976 | Davitt . | |
| 4,358,373 | 11/1982 | Jubevill | 210/179 |
| 4,424,112 | 1/1984 | Rendall . | |
| 4,545,892 | 10/1985 | Cymbalisty et al. . | |
| 4,783,268 | 11/1988 | Leung . | |
| 4,913,814 | 4/1990 | Singh et al. . | |
| 4,946,597 | 8/1990 | Sury | 210/705 |
| 5,118,408 | 6/1992 | Jasen et al. | 208/425 |
| 5,160,605 | 11/1992 | Noestheden . | |
| 5,484,534 | 1/1996 | Edmondson . | |

FOREIGN PATENT DOCUMENTS

| | | |
|---|---|---|
| 55010712 | 1/1980 | European Pat. Off. . |
| 0 045 542 | 2/1982 | European Pat. Off. . |
| 1406632 | 9/1972 | United Kingdom . |
| WO 85/01884 | 5/1985 | WIPO . |
| WO 95/07325 | 3/1995 | WIPO . |

OTHER PUBLICATIONS

Wakefield (1993) The Jet–Pump Scrubber, *Quarry Management* pp.19–24.

*Primary Examiner*—Helane Myers
*Attorney, Agent, or Firm*—Swanson & Bratschun LLC

[57] ABSTRACT

In a process for separating oily films from sand particles carried in a solvent free water stream, the use of a jet pump scrubber in a density classification tank to treat such oily coated particles at controlled operating temperatures above 65° C. whereby at such controlled temperature enhanced cavitation in said jet pump separates said oily film from said sand particles to form slop oil, said tank providing for recirculation of sand particles through said jet pump before discharge.

14 Claims, 19 Drawing Sheets

JET PUMP TREATMENT OF HEAVY OIL PRODUCTION SAND

This application is a continuation-in-part application of U.S. application Ser. No. 09/026,761 filed Feb. 20, 1998.

FIELD OF THE INVENTION

This invention relates to process and apparatus for separating oily films from sand particles and the like. The process and apparatus involve the use of a jet pump scrubber to separate the oily films.

BACKGROUND OF THE INVENTION

A variety of techniques have been developed to remove oily films from particulate material and to separate oily material from particulate material and aggregates. Such methodology has been developed in conjunction with the removal of clays from particulate material, mineral fines from particulate material and the treatment of sands common to heavy oil production and tar sands production. Such techniques commonly involve a type of washing to remove the oily films and commonly involve the use of high intensity mechanical processes that are very demanding from a maintenance standpoint. In the field of heavy oil sands treatment, the most common techniques involve the use of washing tanks with mechanical mixing, followed by separation and dewatering using screw augers, centrifuges, cyclone separators and the like. This technology is inefficient in effecting a good separation of the contaminants including the sand particles and the developed slop oil emulsion. The processes are very labor intensive, require a high level of maintenance and hence in many applications are ineffective and uneconomical.

Looking to related industries, U.S. Pat. No. 5,160,605 describes a device for separating hydrocarbon products, such as cutting oils from water. A reasonably good separation is achieved by the use of settling tanks where the separated oil layer is skimmed by the use of a venturi pump to transport the skimmed oil to a second settling tank which is highly concentrated with hydrocarbon products. The water jet provides a convenient device for pumping the water and oil mix from one settling tank to the other.

U.S. Pat. No. 5,484,534 uses a venturi inductor to develop small bubbles of vapor which attach themselves to the oil and solid particles, thereby floating them to the surface and effect separation of the disbursed oil and solids from the water.

U.S. Pat. No. 4,783,268 describes the use of a micro-bubble generator which is used in the primary flotation/settling step of the hot water process to yield increased bitumen recovery. The micro-bubble generator involves the use of a jet nozzle which draws in a stream of air. The micro-bubbles are then generated in the mixing chamber to enhance the hot water process for extracting bitumen from mined oil sand.

U.S. Pat. No. 4,913,814 describes the use of jet pump mixing for mixing a liquid to be treated with another appropriate liquid to achieve solvent extraction. In order to enhance the solvent extraction process, the jet pumps are set up in a counter current cascade manner. The same stream is applied to the drive port of each jet pump in the cascade and the other flow stream is applied to the suction port of each jet pump in the cascade. The jet pumps in the cascade increase in size from a high pressure to a lower pressure end of the cascade so that the suction pressure required at successive jet pumps is reduced.

U.S. Pat. No. 4,424,112 described the use of a jet mixer in the solvent extraction of bitumen oils from tar sands. The jet mixer has an inlet into which the solvent soaked tar sands and hot water flow. The jet mixer is designed such that the pressure drop across the jet is sufficient to pulverize any rocks in the solvent soaked tar sands and that the total quantity of water entering the jet mixer is both mixed with the solvent soaked tar sands at the inlet. The slurry exiting the jet mixer continues the solvent extraction of the bitumen oils from the solid particles in the slurry. Due to the presence of solvent in the slurry, the temperature of the water is constrained so as to ensure that the solvent is not driven off from the solvent soaked tar sands. The jet mixer also serves the purpose of transferring the solvent soaked tar sands directly from one tank to a bitumen extract separator.

An article published in Quarry Management, February 1993 by A. W. Wakefield, entitled "The Jet-Pump Scrubber" describes a system for removing clay particles from the surfaces of sand particles. The jet pump scrubber is operated to produce vapor bubbles in the jet stream. The bubbles collapse at the surfaces of the sand particles to cause a shockwave in the sand particles due to cavitation in the mixing chamber and thereby remove clay particles from the sand surfaces. This action may be used to remove, for example, iron particles from the surfaces of larger particulate materials.

None of the above processes contemplate the application of jet pump scrubber technology in the removal of oily films from particles particularly sand particles, other than by solvent extraction. In accordance with this invention, applicant has found quite surprisingly that jet pump scrubber technology may be used to remove the oily film from the surfaces of particulate materials when the jet pump scrubber is operated under particular conditions and within a tank which provides for recirculation of the particles for retreatment in the jet pump scrubber.

SUMMARY OF THE INVENTION

In accordance with an aspect of the invention, a process for separating oily films from sand particles carried in a solvent free water stream, the use of a jet pump scrubber in a density classification tank to treat such oily coated particles at controlled operating temperatures above about 65° C. whereby at such controlled temperature enhanced cavitation in said jet pump separates the oily film from the sand particles to form slop oil, the tank providing for recirculation of sand particles through the jet pump before discharge.

The classification tank preferably comprises a vertical mid-section, a converging bottom section and a divergent upper section. The jet pump scrubber is positioned in the mid-section adjacent the bottom section and extends transversely of the tank. The jet stream draws in surrounding water and already treated sand particles, water and separated oily film flowing upwardly from the jet pump scrubber and the sand particles falling downwardly towards the bottom section. The upwardly flowing water and slop oil separate in the divergent upper section wherein upward flow velocities decrease. Means is provided for inducing the slop oil to float which is removed along with water by an upper weir. Such inducing means may be fine air bubbles or a dissolved form of air.

In accordance with an aspect of the invention, a jet pump scrubber tank assembly for use in separating oily films from sand particles comprises;

i) a tank having a vertical mid-section, a divergent upper section and a convergent lower section;

ii) means for injecting air into the upper section to facilitate floating of slop oil separated from sand particles;

iii) a jet pump scrubber mounted in the mid-section adjacent the bottom and comprising a jet nozzle, scrubber chamber and a target which are aligned and extend transversely of the tank, iv) means for injecting a heated aqueous medium in the region of the jet pump scrubber;

v) means for measuring differential pressure between tank positions in the mid-section and in the bottom section; and vi) means for controlling the heated aqueous medium injection means based on input from the differential pressure measuring means.

In accordance with another aspect of the invention, a processing facility for removing an oily residue from sand particles, the facility comprising:

i) a hopper for receiving oily coated sand, means for injecting steam and water to heat the sands and separate oils therefrom, means for injecting air into the hopper to float separated oils;

ii) a pump for transferring the sand particles with an oily film to a jet pump scrubber in a tank assembly comprising:

a) a tank having a vertical mid-section, a divergent upper section and a convergent lower section;

b) means for injecting an air stream into the upper section to facilitate floating of slop oil separated from sand particles;

c) a jet pump scrubber mounted in the mid-section adjacent the bottom and comprising a jet nozzle, scrubber chamber and a target which are aligned and extend transversely of the tank, d) means for injecting a heated aqueous medium in the region of the jet pump scrubber.

In accordance with another aspect of the invention, a water treatment system for desalting producing waters from a sand washing facility, the system comprising:

i) solid/liquid classification vessel with means for fluidizing sand in a bottom portion of the vessel;

ii) a jet pump for transferring sand from the vessel to a solid/liquid separator;

iii) a water distillation unit and means for transferring liquid from the separator to the distillation unit;

iv) a fresh water storage tank and means for transferring distilled water from the distillation unit to the storage tank;

v) means for withdrawing fresh water from the storage tank and pressurizing the water to provide motive power for the jet pump and provide fresh water for the fluidizing means for the vessel bottom.

BRIEF DESCRIPTION OF THE DRAWINGS

Preferred embodiments of the invention are described with respect to the drawings wherein.

DETAILED DESCRIPTION OF THE PREFERRED EMBODIMENTS

Figure 1A:
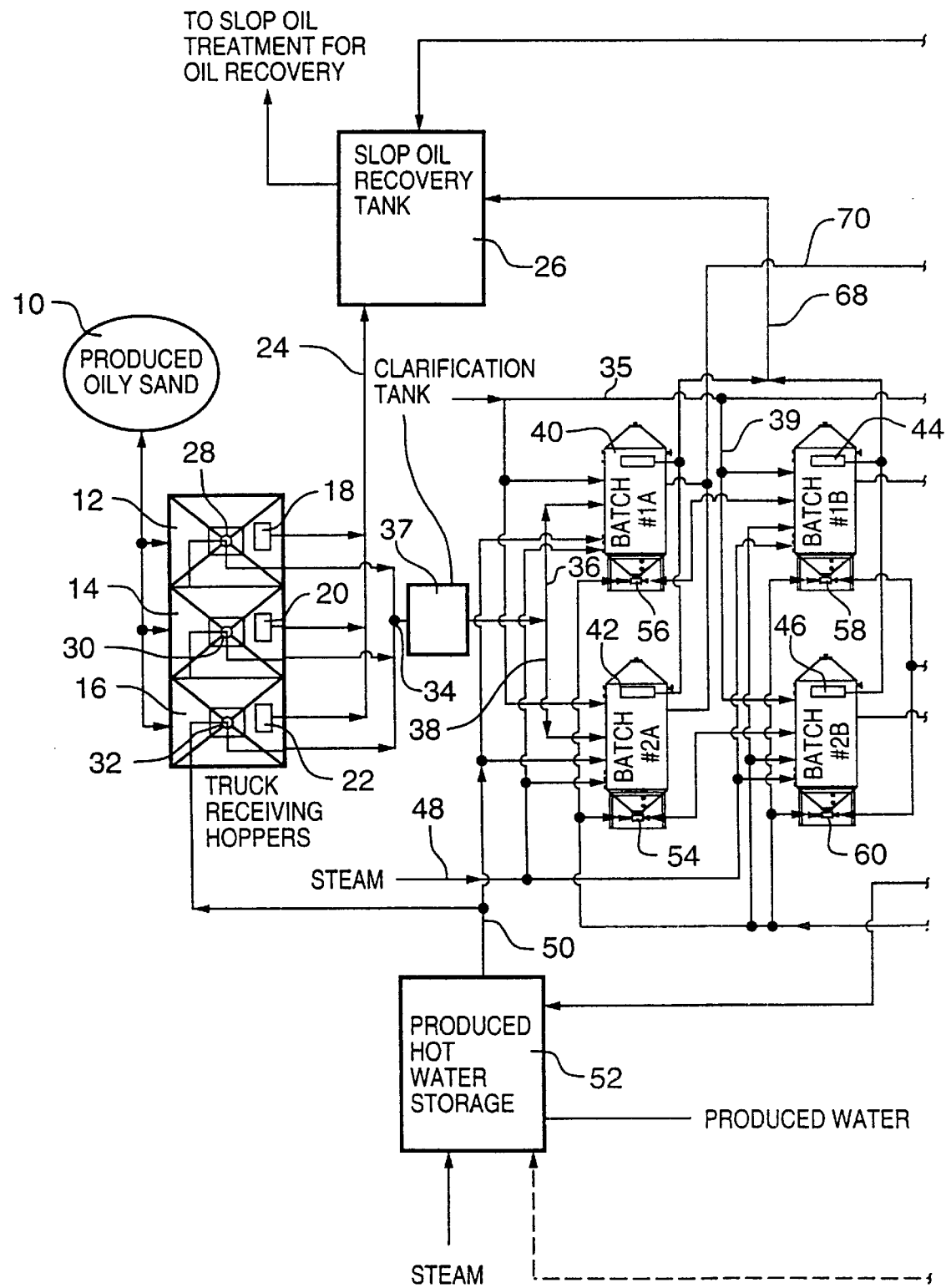
FIGS. 1A, 1B and 1C are schematics of the physical plant for treating production oily sands and contaminated soils to separate and concentrate slop oil emulsion, water and solid material fraction.
Figure 1B:
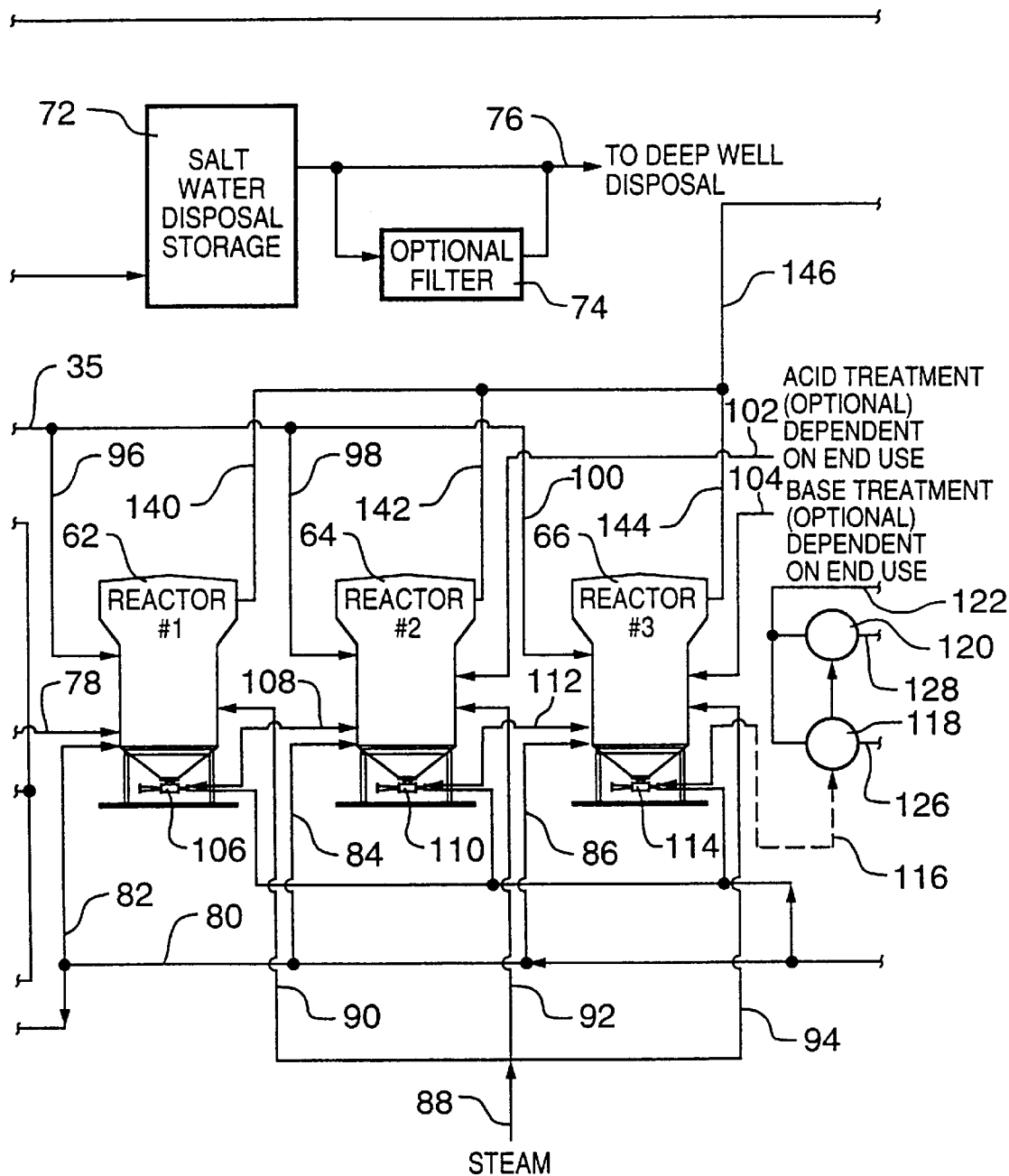
Figure 1C:
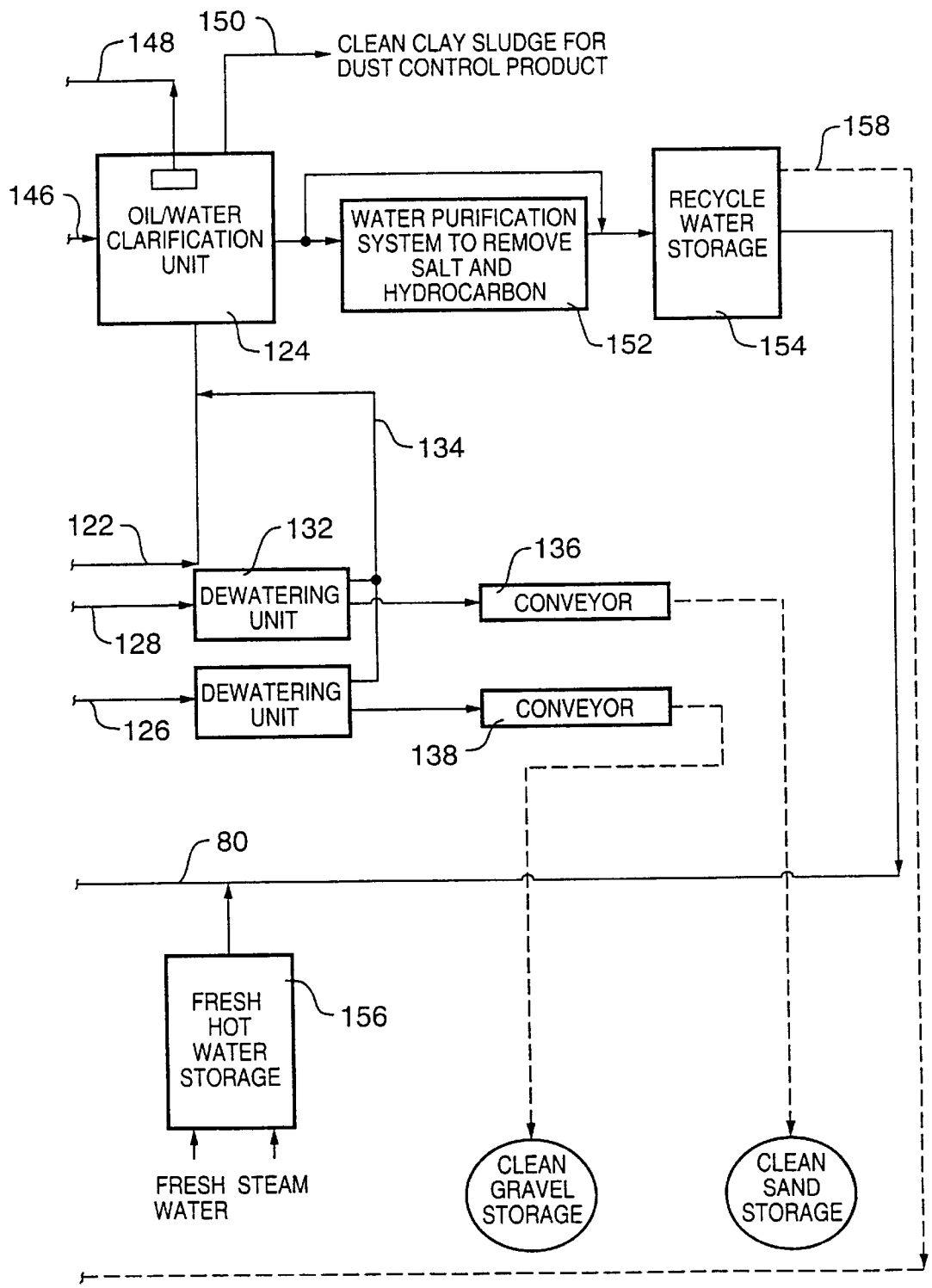

In advance of discussing the details of the invention which resides in the use of a jet pump scrubber under particular operating conditions to surprisingly achieve removal of oily films from sand particles and the like, an overview of one embodiment of the process for treating particulate materials is described with respect to FIGS. 1A, 1B and 1C which constitute sections of the overall block diagram of the process. It is understood that the technology may be applied to removing any type of oily film which is hydrocarbon based from particulate material, such as oils, polymers, paints, creosotes, coal tars, crude oils and the like. In accordance with a preferred embodiment of the invention, the technology is applied to removing oily films from sand particles, such as derived from processing of crude oil mined from heavy oil fields or from tar sands. In particular, the technology may be applied to the treatment of oily coated sand particles derived from a heavy oil processing facility which has as its waste by-product production oily sands. The production oily sands were normally discarded and recycled back into the ground. Now by virtue of this invention, the production oily sands may be treated and the sand recycled for conversion or manufacture of a value added product. As shown in FIG. 1A, the produced oily sands 10 may be fed into truck receiving hoppers 12, 14 and 16. The trucks dump the production oily sands into the respective hoppers which contain sand particles covered with hydrocarbon products and salt. Each feed hopper 12, 14 and 16 is equipped with a jet transfer pump, high temperature water injection headers, aeration headers, truck wash spray cannons, screens and hydrocarbon slop oil emulsion recovery systems. The high temperature water is initially supplied via a water cannon to assist in the unloading of produced oily sands from the truck beds. The use of the water cannons achieves an effective fluidization of the material from the trucks into the truck receiving hoppers. High temperature water is introduced to the truck receiving hoppers with a minimum temperature of about 80° C. Air is also introduced at a mid-point of the hopper to facilitate separation of clays, hydrocarbon products and colloidal matter from the solid sand particles. Such air may be derived from line 35. The hydrocarbon products and slop oil emulsions are collected from each hopper via an overflow weir collection system at 18, 20 and 22 and fed through line 24 into the slop oil recovery tank 26. A jet pump at the respective base 28, 30 or 32 of tanks 12, 14 and 16 deliver the particulate material coated with an oily film to line 34 which is passed into a clarification tank 37. The oily coated sand particles settle to the bottom of the clarification tank. The slop oil and water is separated from the top of the tank. The sand particles are removed from the bottom of the tank and transferred via lines 36 and 38 to deliver the particulate material to either treatment tank 40 or 42. The sand may be removed from the tank bottom by various techniques, such as by jet pump or tank desanding apparatus as described in applicant's co-pending U.S. application Ser. No. 09/028,905 filed Feb. 24, 1998.

Two trains of batch treatment reactors 40, 42, 44 and 46 are used whereby reactors 40 and 44 operate in series and reactors 42 and 46 operate in series but parallel to the first set of reactors. The respective sets of reactors are operated in parallel such that when one series of reactors is performing a treatment, the other series of reactors are being filled or emptied. It is understood that a clarification tank 37 may be interposed in line 34 to provide a point of collection of production sand from the various hoppers and thereby function as an accumulation in the overall process. The jet pumps may deliver the sands from hoppers 12, 14 and 16 to the clarification tank 37. Separated slop oil may be removed from the clarification tank and the sand allowed to settle. A jet pump tank desanding system may be used to remove oily sand from tank bottom and transfer the oily sands to the batch reactors. A metering device may be used to transfer determined quantities of sand particles to said batch reactor for treatment. Such metered quantities of oily sands provide a controllable feed input to the system for treatment.

Details of the batch reactor will be described with respect to FIG. 2. Steam is introduced to each batch reactor via line 48. Hot water is introduced to each batch reactor via line 50. The hot water from the storage tank 52 is also used as noted in the truck receiving hoppers 12, 14 and 16. In the series of batch reactors, further treatment of the sands is achieved via the introduction of steam and water to further separate oils from the particulate material. Jet pumps at 54, 56, 58 and 60 are used to transfer the sand material from the base of each tank to the other tank in the series or onto the sand scrubber reactors to be described with respect to FIG. 1B. Optionally jet pump scrubbers may also be used in the batch reactors to enhance the separation of the oily materials from the sand particles before the sand particles are treated in the recirculating batch reactors. After a pause period, air flotation is induced in each batch reactor to enhance the separation of the heavy hydrocarbon material, other organic matter and clays, the treated sands fall to the bottom of each batch reactor.

Depending on which series of batch reactors are being emptied, either jet pump 58 or jet pump 60 transfers the oily sands to the jet pump scrubber system as shown in FIG. 1B and itemized as density classification tanks 62, 64 and 66. The slop oil recovered from the skimmer of each batch reactor is transferred via line 68 to the slop oil recovery tank 26. The salt water recovered from each batch reactor is transferred via line 70 to a salt water disposal storage 72 which may optionally be filtered at 74 before deep well disposal via line 76. The oily coated sands are introduced to reactor 62 from either jet pump 58 or 60 via line 78. Treated water is introduced via line 80 into each reactor via respective lines 82, 84 and 86. Steam is introduced to each reactor from line 88 which is split into lines 90, 92 and 94. Air is introduced to each reactor from the air supply in line 35 of FIG. 1A which also supplies air to the batch reactors in lines 37, and 39. The air supply in line 35 of FIG. 1B is split and supplied to individual reactors 62, 64 and 66 via lines 96, 98 and 100. Optionally acid may be introduced to reactor 64 via line 102 to enhance its separation. In reactor 66, base material may optionally be introduced via line 104. It is appreciated that the acid treatment may be conducted in advance of the density classification tanks, such as in the batch reactors 40, 42 or 44, 46.

The jet pump scrubber for each reactor will be described in more detail with respect to FIGS. 3 and 4. The jet pump scrubber in reactor 62 is fed via line 78. A jet pump 106 supplies the jet pump scrubber in reactor 64 via line 108. The jet pump 110 at the base of reactor 64 supplies reactor 66 via line 112. The jet pump 114 transfers the sands via line 116 into cyclone separators 118 and 120. The oily materials separated from the cyclone separators is transferred via line 122 to the oil water clarification unit 124 of FIG. 1C. The particulate material from the cyclone separators 118 and 120 is transferred via lines 126 and 128 to the respective dewatering units 130 and 132. Water removed from the dewatering units is transferred via line 134 to an oil water clarification unit 124. The particulate material via conveyors 136 and 138 is shipped as clean gravel and as clean sand depending upon the size of the particulate segregated by the cyclone separators 118 and 120. The oil water which floats to the top of each reactor 62, 64 and 66 is removed respectively via lines 140, 142 and 144 for delivery through line 146 to the oil water clarification unit 124. The oil removed from the unit 124 is delivered via line 148 to the slop oil recovery tank 126. Any fines that are removed from unit 124, which include clean clay sludge, is removed via line 150. The water from unit 124 may optionally be treated in the water purification system 152 before transfer to recycle water storage unit 154. Such water purification system may include a treatment system which provides fresh water quality. Such systems are described with respect to the following embodiments. Make-up hot water is provided from tank 156 and introduced to line 80 which transfers the hot water from the water storage 154 to the respective reactors as well as the batch treatment tanks. Water may also optionally be transferred via line 158 to the hot water storage tank 52. Such optional recycle of the water in the storage tank may be done when the electrical conductivity of the process water exceeds a predetermined level. For example, when the process water exceeds 1500 umhos/cm due to contaminants, the water is completely recycled to the hot water storage tank 52 for use in the initial treatments in the truck receiving hoppers and the batch rectors. Usually, the increase in electrical conductivity is due to an increase of salt load in the recycle water storage tank. This higher salt load assists in the separation of hydrocarbon products and slop oil emulsions in the batch reactors.

The cyclone separators 118 and 120 may grade the particulate material. Cyclone separator 118 may separate out the large particulate material of 250 microns and larger which is generally referred as gravel. The sand material, which is less than 250 microns, is separated out by cyclone 120 for treatment in the dewatering unit before conveying to clean sand storage.

The efficiencies of the jet pump scrubber unit in density classifiers 62, 64 and 66 far exceeds the efficiency of any other known process in removing oily films from sand particles without the use of deleterious hydrocarbon solvents. The sand conveyed in conveyor 136 readily meets the following guidelines where the percent solids for the conveyed sand slurry is equal to or greater than 70% by weight.

TABLE I

| Parameter | Maximum Limit |
| --- | --- |
| Hydrocarbon Content: | <200 mg/kg |
| Electrical Conductivity: | <2 dSm-1 |
| Chloride Concentration: | <250 mg/L |
| Sodium Adsorption Ratio | <5 |
| pH | 6.0 to 8.0 |

Figure 2:
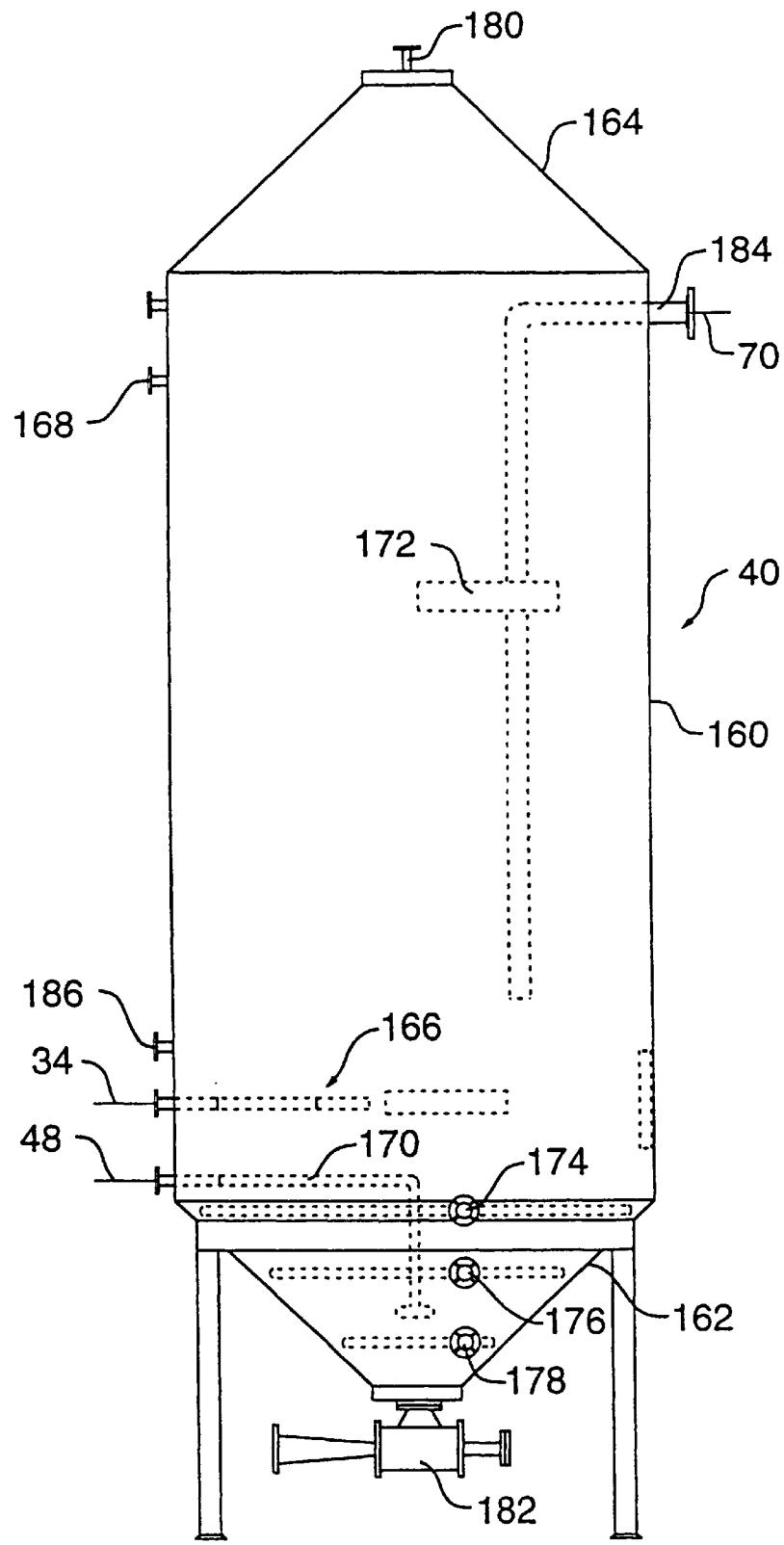
FIG. 2 is a side elevation of a batch treatment tank.

In FIG. 2, a batch reactor 40 is shown in side elevation. The batch reactor preferably has a cylindrical tank 160 with converging bottom 162 and converging top 164. The sand slurry is introduced via line 34 into the jet pump scrubber 166. The sand slurry is introduced until the level in the tank 160 attains the level indicated by eye level control 168. Once filled to this level which is approximately 90% of the capacity of the tank, high pressure steam, preferably at a pressure of 150 psi or greater, is introduced via a distribution manifold 170 which receives the steam from line 48. The steam is introduced into the sand slurry for a predetermined period of time, normally less than 15 minutes. Following the treatment with the steam, a pause period is programmed into the batch treatment controller to allow distribution of the heat from the steam and separation of hydrocarbon products and slop oil emulsions from the solid material. The pause period usually does not exceed 5 minutes. Following the pause period, induced air flotation is activated in order to carry heavy hydrocarbon products and organic matter, such as colloids and clays, to the liquid surface where it is collected via an automated skimming system 172. Air is introduced to the batch treatment reactor via manifolds 174, 176 and 178. Any condensate fumes are collected via the vent 180. Flush water may also be introduced to the tank through the manifolds 174, 176 and 178. The particulate material, which is settled to the base of the tank after the air treatment, is delivered by way of jet pump 182 to the first of the jet pump scrubber classifier tank 62. The slop oil, which is skimmed from the batch reactor, is removed through outlet 184 and delivered to the slop oil tank by line 70. The temperature of the slurry in the tank is measured at temperature sensor 186. The jet pump scrubber, as provided in tank 160, may be of the type as described with respect to the system shown in FIG. 3. Although in the batch reactor, the jet pump scrubber achieves more of a separation of the oily materials from the sand particles which still carry an oily film as delivered from the base 162 of the batch reactor via the jet pump 182.

Figure 3:
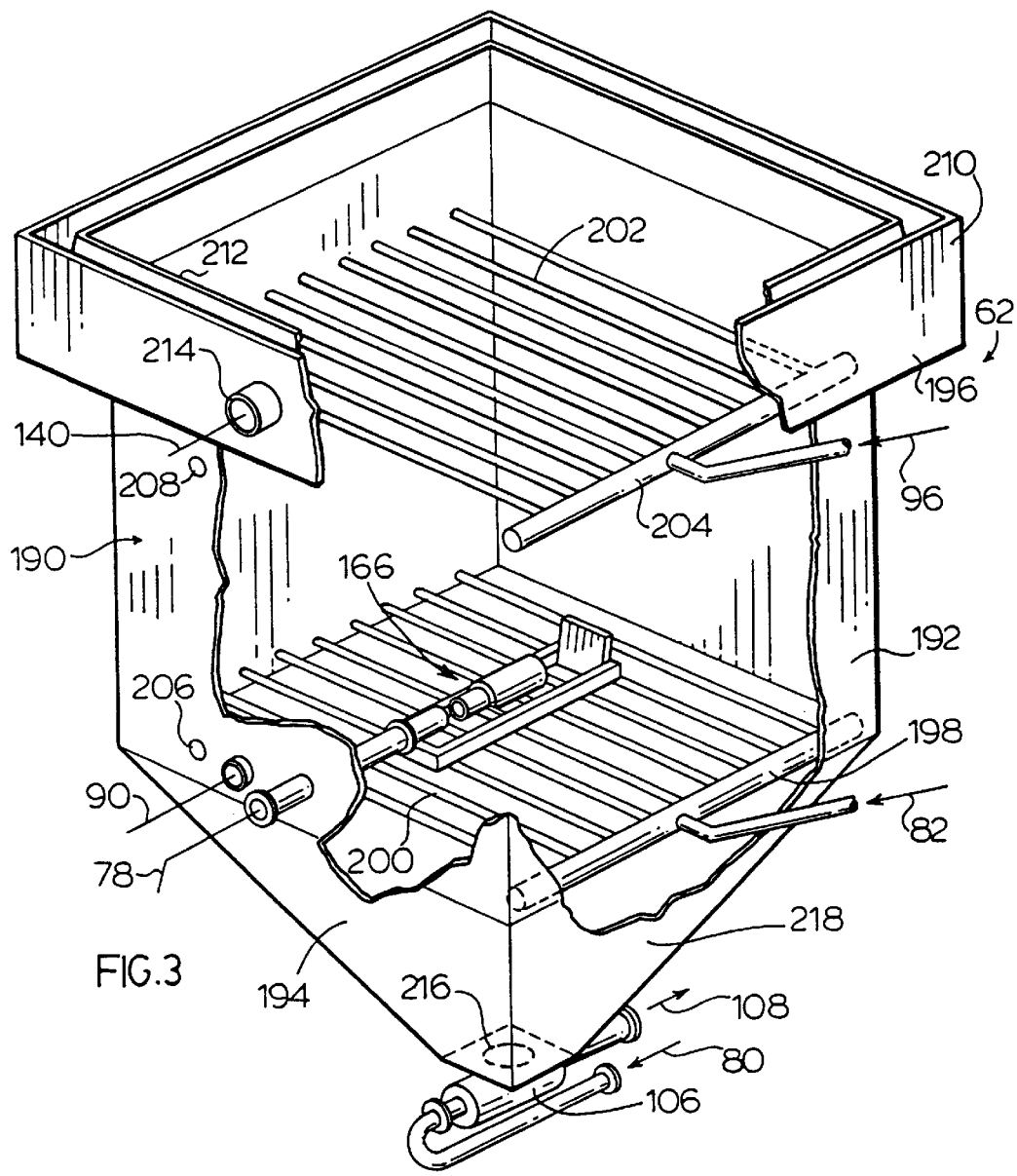
FIG. 3 is a section through a density classification tank in which a jet pump scrubber is provided.

FIG. 3 illustrates detail of a selected jet pump scrubber tank system 62. The tank 190 has a vertically oriented mid-section 192, a converging bottom section 194 and a diverging upper section 196. Relating the process lines of FIG. 1B to FIG. 3, motive water is introduced to the jet pump 106 via line 80. The pumped sand slurry from the converging section 194 is delivered via line 108 to the second jet pump scrubber. The incoming sand slurry to the jet pump scrubber 166 is provided at line 78. Steam to maintain a desired temperature in the tank is provided via line 90. Hot water to develop the desired upward flow of materials in the tank 190 is provided via line 82. Pressurized air for enhancing flotation in the diverging section 196 is provided in line 96. Slop oil and water taken off of the tank is delivered in line 140. The hot water introduced to the system from line 82 enters a manifold 198 which distributes the hot water to individual perforated pipes 200. Similarly the air to induce flotation of the slop oil to the surface is distributed to individual perforated air pipes 202 by way of a manifold 204. Both the perforated water pipes 200 and perforated air pipes 202 extend transversely of the tank and are mounted therein to the sidewalls where their positioning is shown in more detail in FIG. 4. The pipes extend parallel to one another and thereby develop the desired distributed upward flow of hot water from pipes 200 and air bubbles from pipes 202. Media pressure sensing devices are mounted in the vertical section 192 at locations 206 and 208. The overflow weir is located inside of the upper walls 210 for the diverging section 196. The weirs are defined by intersecting plates 212. The water and slop oil, which flows over the weir plates 212, is removed via the outlets 214 and delivered through line 140 as shown in FIG. 1B to the oil water clarification unit 124 as shown in FIG. 1C. The particulate fines and sand particles, which fall downwardly of the tank 190, settle to the intake port 216 of the jet pump 106 by virtue of the sidewalls 218 sloping inwardly and downwardly towards the intake 216.

Figure 4:
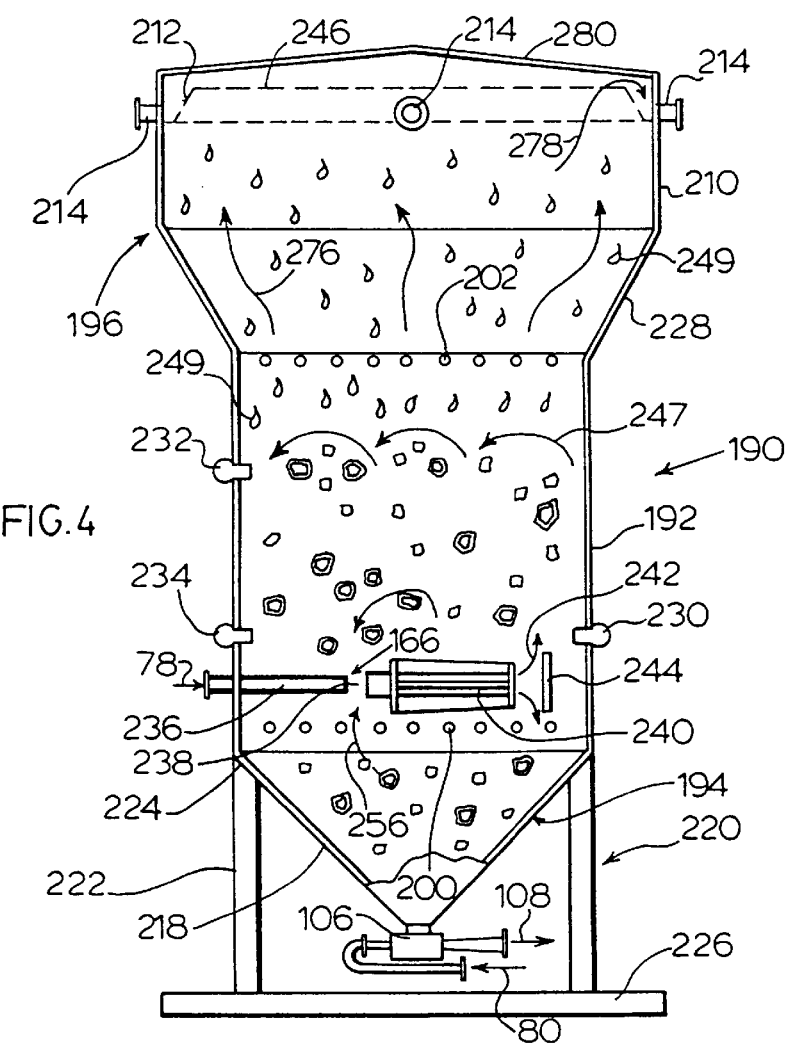
FIG. 4 is a section through the jet pump scrubber tank of FIG. 3.

Turning to FIG. 4, the tank 190 is supported by a base 220 having uprights 222 connected to the converging section 194 at juncture 224. The uprights 222 are connected to a platform 226 which may rest on a suitable foundation. In accordance with this particular embodiment, tank 190 is rectangular or square in cross-section; hence in the converging section 194, the sidewalls 218 slope inwardly from the mid-section sidewalls 192 and toward the intake 216 of the jet pump 106. As a result, the converging sidewalls 218 are triangular in shape. Similarly with the diverging upper section 196 from the mid-section sidewalls 192 are outwardly diverging portions 228 which lead into vertical upper wall sections 210. The jet pump scrubber 166 is located adjacent the bottom section 194 and immediately above the hot water perforated tubes 200. Also in accordance with this embodiment, the perforated air tubes 202 are located at the juncture of the diverging section 196 and the vertical mid-section 192. In order to ensure proper separation of the slop oil from the particulate material, the temperature of the media in the tank as well as the relative pressures in the tank are monitored. The temperature in the tank may be monitored by transducer 230. The pressure over a vertical section of the tank is measured by transducers 232 and 234.

The jet pump scrubber 166 has a nozzle 236 which develops a jet stream in region 238. The jet stream draws surrounding material which includes any particulate material settling in that region into the jet stream for introduction to the mixing chamber 240. The scrubbed material emerges into region 242 and, in accordance with this embodiment, impacts on a target 244. The target is preferably canted slightly upwardly to deflect the emerging material upwardly of the tank mid-section 192. Due to the significantly higher density of the sand particles, even though they are deflected upwardly, they commence settling towards the converging section 194. The details of the manner in which the oily film is separated from the sand will be discussed in respect of FIGS. 5 and 6. The elutriation water introduced through lines 200 direct streams of elutriant water upwardly over the jet pump scrubber and towards the upper divergent section 196. The upward velocity of the introduced hot water is controlled to ensure that the sand particles, other than the fines, are not carried up into the divergent upper section 196. To achieve this control, pneumatic force balance pressure sensing devices 232 and 234 mounted at locations 206 and 208 of FIG. 3 measure the difference in pressure between levels at transducers 232 and 234. The proportional output signal from the transducers is coupled to a pneumatically operated valve for the incoming water supply and thereby maintain the desired specific gravity of the particulate material suspension in the vertical mid-section 192 of the tank. This thereby determines the retention time of the solid material in the mid-section of the tank in order that they are recycled through the jet pump scrubber 166 to continue thereby the removal of oily films from the particles. By virtue of this control, the operation of the vessel is not affected by variations in the solid feed rate up to, of course, the vessels designed capacity. The rising water current velocity and density of the solid material progressively increases with the height of the vessel. Alternatively, it is understood that the perforated water pipes may be positioned to direct the flow of water downwardly into the converging region 194. This stirs up the settling sand particles so that they are recycled back through the jet pump scrubber for further treatment. In this arrangement, the water flow may be slightly increased to compensate for the losses of energy in the water flowing downwardly before returning upwardly of the tank 192 towards the diverging section 196. Alternatively, fluidization nozzles may be placed in the bottom section to induce fluidization in the sand particles for purposes of discharge through the reactor bottom. Further details of this design are described with respect to FIG. 8.

Figure 5:
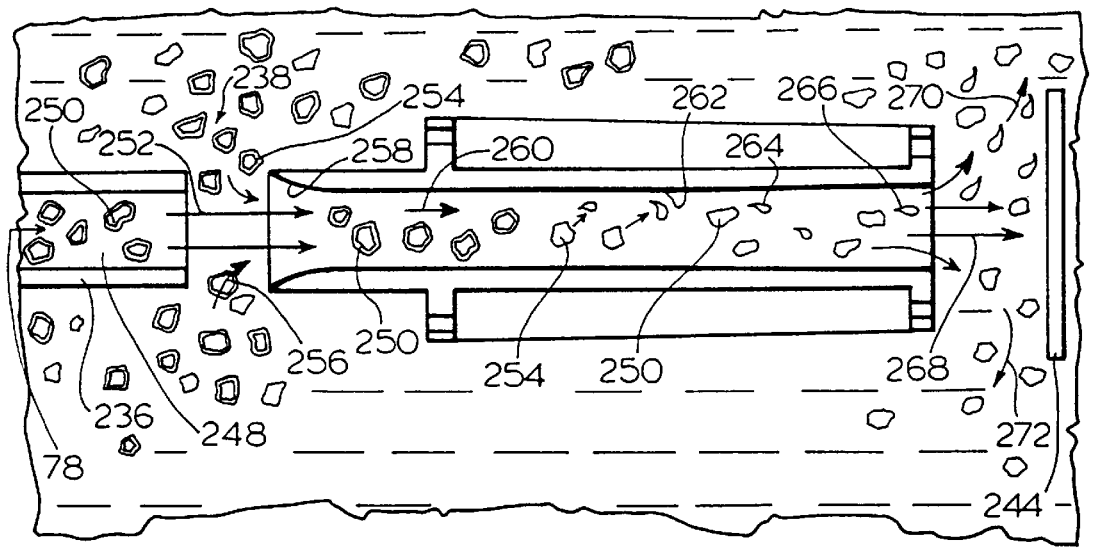
FIG. 5 is a schematic of the jet pump scrubber activity.

In accordance with this invention, the temperature of the slurry of the jet pump scrubber 166 is ideally controlled to enhance cavitation within the jet pump mixer 240, the purpose of which will be described in more detail with respect to FIG. 5. The temperature of the media may be sensed by transducer 230. Steam may be injected through line 90, as shown in FIG. 3, to heat the media in the region of the jet pump scrubber to compensate for varying flows of the hot water being introduced in lines 200 and as well heat losses through the tank walls. Preferably the temperature of the media is maintained above about 80° C. to achieve sand quality as set out in preceding Table I. It is appreciated that lower temperatures may be employed when a lower quality of cleaned sand is acceptable, such as described in the following alternative embodiments. Superior performance is achieved at temperatures above 80° C. to less than boiling point temperature of the media, which is usually at about 100° C. Heating of the medium may be achieved by pressurized steam with a maximum pressure of about 150 psi being injected through line 90 into the lower part of the vertical section 192 of the tank.

To facilitate separation of the slop oil from the particulate fines, diverging section 196 is designed to reduce the velocity of the upward flow of water towards the upper edge 246 of the weir 212. The sudden decrease in water velocity permits any fines in the diverging section 196 to drop out and return to the bottom in the direction of arrows 247. To further enhance the separation, air is introduced through lines 202 to form upwardly floating fine bubbles or provide dissolved air in the diverging section. The bubbles or dissolved air attach to the upward travelling hydrophobic slop oil particles 249 to carry them upwardly towards the weir upper edge 246. The fines and remaining particulate in the diverging section fall downwardly of the mid-section 192 towards the converging section 194 due primarily to the flotation induced by the air bubbles acting on the oil droplets.

Although a relatively good separation is effected in the jet pump scrubber tank 190, particularly due to the provision of recirculating sand particles for further treatment in the jet pump scrubber, more than one tank may be used in a series where the sand particles settling in the converging section 194 had delivered another jet pump scrubber tank assembly of the type of FIG. 4. In addition, any fines which are carried with the slop oil through outlets 214 may be separated and either returned for retreatment in the jet pump forward tank assembly or may be used for other purposes as spraying on roads and the like for dust control.

Figure 6:
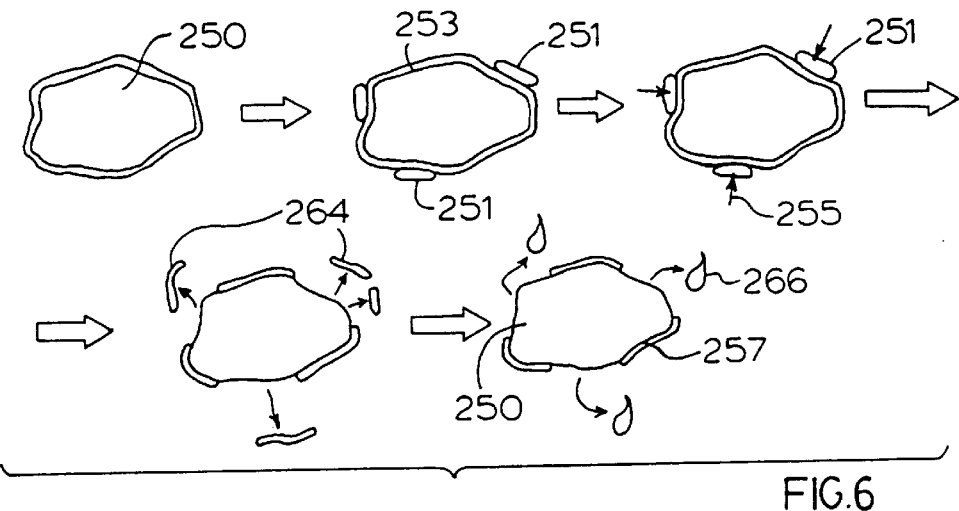
FIG. 6 is a schematic of recirculating sand particles in the density classification tank of FIG. 3.

The mechanism by which the jet pump scrubber is capable of removing oily films from sand particles is not completely understood because of this novel application of previously known jet pump scrubber technology. Normally jet pump scrubber technology, as described for example in the aforementioned Quarry Management journal article of 1993, relies on cavitation being developed in the jet pump scrubber mixer which induces shock waves in the particles to remove clay particles or mineral particles on the surfaces of such sand particles and other like particles. It is therefore theorized, as will be discussed with respect to FIGS. 5 and 6, that cavitation particularly at the elevated temperatures of operation of this invention results in an enhanced form of cavitation in the jet pump mixer 240 which, coupled with intense mixing produced by the preferred design of the scrubber, causes the oily film on the sand particles and like particles to separate from the particles and form oil droplets which migrate upwardly away from the sand particles. With reference to FIG. 5, the jet pump nozzles 236 delivers a slurry of water 248 and oily coated particles 250 into a jet stream 252 in the region 238. The jet stream 252 draw in surrounding already treated particles 254 in the direction of arrows 256. The high velocity jet stream, as it emerges from the nozzle 236, experiences a sudden drop in pressure. It is theorized that, at the operating temperatures of 80° C. and preferably up to the boiling point of about 100° C. the water in the jet stream 252 as well as the water drawn in through region 238 partially vaporize to form air bubbles 251 as shown in FIG. 6, on the surfaces 253 of the oily coated particles 250 and 254. The jet stream at this reduced pressure, but very high velocity enters the jet pump scrubber mixer 240 through the throat portion 258. The jet stream continues in the direction of arrow 260 through the mixing tube 262 which is designed to suddenly increase the pressure in stream 260 and thereby cause cavitation where air bubbles 251 on particles 250 and 254 cavitate, that is, implode as indicated by arrows 255. Such sudden implosion of the air bubbles develop a shock wave at the particle surfaces to release at least a portion 257 of the oily film designated 264. The released portions of oily film 264 coagulate to form droplets 266 and are diffused in exiting stream 268 to impact on the target 244. The target 244 may be of any erosion resistant material, such as, alloy metals or polymer compounds, for example, hard rubber. The droplets 266 generally flow upwardly in the direction of arrow 270 and the particulate material, particularly the heavier particles, flow downwardly in the direction of arrows 272. The size of the jet nozzle 236, the throat 258 in the mixer 240 as well as the shape of the mixer tube 262 may be designed to ensure that cavitation takes place in the mixer tube 262. However, as applicant has surprisingly found with the treatment of sand particles having oily films, the temperature of the media to be treated should be in excess of about 80° C. It is theorized that these higher temperatures are required in the treatment of oily coated particles to enhance the rate at which air bubbles 251 form on the particles 250 and 254 in the region of the jet stream 252 due to the sudden drop in pressure. This higher temperature ensures the rapid formation of air bubbles on the particles to effect the necessary implosion within the mixer tube 262 to effect the removal of the oily films 264 from the particles 250 and 254 depending on whether they are introduced by the jet stream or enter via low pressure region 238. It is appreciated that as the particles exit from the jet pump mixer 240 and impact on the target 244 or the tank sidewall, not all of the oily film may be removed, as indicated by remaining portion 257. Hence in accordance with this invention, the tank is designed to recirculate the particles in the direction of arrows 256 which are also shown in FIG. 4. Such recirculation is achieved by the flow of water out of the hot water tubes 200 and also by tilting the target 244 upwardly encourages particles to flow up and back around into the intake region 238. The rate at which particles are removed at inlet 216 to jet pump 106 thereby determine the residence time of the particles in the tank 190 before passage onto the next jet pump scrubber tank system should further treatment be required. In the meantime, the water flows upwardly in the direction of arrows 274 of FIG. 4 and diverge in the direction of arrows 276 to achieve the separation of the particles from the upward flow of liquids. With the introduction of air through tubes 202, the floated oil and in particular slop oil flows over the weir edge 246 in the direction of arrows 278. The already treated sand is transferred with jet pump 106 to the next jet pump scrubber inlet where a duplication of the treatment in the second tank assembly 64 is achieved. As mentioned, concentrated acid may be added to the slurry material of scrubber 64 to enhance the leaching of metals, clays and the like from the particulate surfaces. In the third jet pump scrubber tank system 66, a base may be added to adjust the pH of the treated media to within a range of about 6 to 8.5. In accordance with a preferred embodiment of the invention, nitric acid may be used in scrubber 64 and/or 66 to significantly increase the purity of the washed sands. Sufficient nitric acid may be introduced to scrubber 64 and/or 66 to reduce the pH to about 4. Such concentrations of nitric acid increased the percent silicon dioxide concentration in the washed sands to as high as 99%. It has been found that the action of the scrubber unit enhances the acid leaching of impurities from the sand particles, particularly when the scrubber units are operated at higher temperatures usually in excess of 80° C. The preferred acid is nitric acid which is added to provide a pH in the range of 4, but could be added to reduce the pH to as low as 2. There is less chance of contamination of the wash waters by using nitric acid as compared to sulfuric acid, or hydrochloric acid which could introduce sulfur and chloride concentrations beyond the acceptable levels. Downstream of the scrubbers in which acid washing takes place, a base should be introduced to return the pH to about neutral; that is, usually greater than a pH of 6. Sodium based alkaline pH correction chemicals are the least preferred, because of the increase in sodium concentration in the production waters. Other types of increasing agents are preferred, such as amine based materials.

The jet pump scrubber tank system of this invention is capable of operating at controlled temperatures, pressures and densities to achieve treatment and separation. The jet pump scrubber system includes the nozzle, the open low pressure jet area, mixer chamber and preferably a target to reduce wear on tank sidewall. Such scrubber system is to be distinguished from jet mixers and the like which are designed solely for mixing the material and not effecting a cavitation within the mixer system. By virtue of the open region for the jet and locating of the jet pump scrubber near the bottom of the tank, sufficient recycle of the particulate material is achieved to enhance treatment and thereby separation or removal of the oily film from the sand particles. As already mentioned, the pressure transducers are used to provide a discharge slurry for the intake 216 of the tank which is preferably in the range of a specific gravity of 1.68 to 1.72. Such control on density prevents the inclusion of clay and oil being discharged with the sand at the bottom. Instead it is separated and floated upwardly to the diverging region 196. The reactor design readily accommodates the injection of air at the juncture of the mid-section 192 with the divergence section 194. In addition, the introduction of hot water in the region of the jet pump scrubber further enhances the cavitation action in removing films from the sand particles. Temperature is monitored in this region to ensure that the processing temperature is always in excess of at least 80° C. The control system may also include a device for measuring the liquid/solid interface (i.e. sand layer) at any point inside the scrubber tank to ensure that there is not an over accumulation of sand in the tank. Such liquid/solid interface measuring device may be an ultrasonic probe which actuates a controller for the slurry pump to increase rate of removal of sand from the tank or decrease rate at which sand is introduced to the tank. The scrubber tank may also include devices for measuring pH and electrical conductivity of tank liquid in its upper section. These measurements may be relied on in determining the extent to which the process waters need to be treated to provide an acid pH or neutral pH, or to reduce, for example, the salt concentration in the water. The jet pump scrubber tank assembly is preferably closed and as shown in FIG. 4, a lid structure 280 ensures that regardless of the flow rates of incoming slurry and hot water, the tank does not overflow. Instead, all waters are forced out of the outlets 214.

Figure 7A:
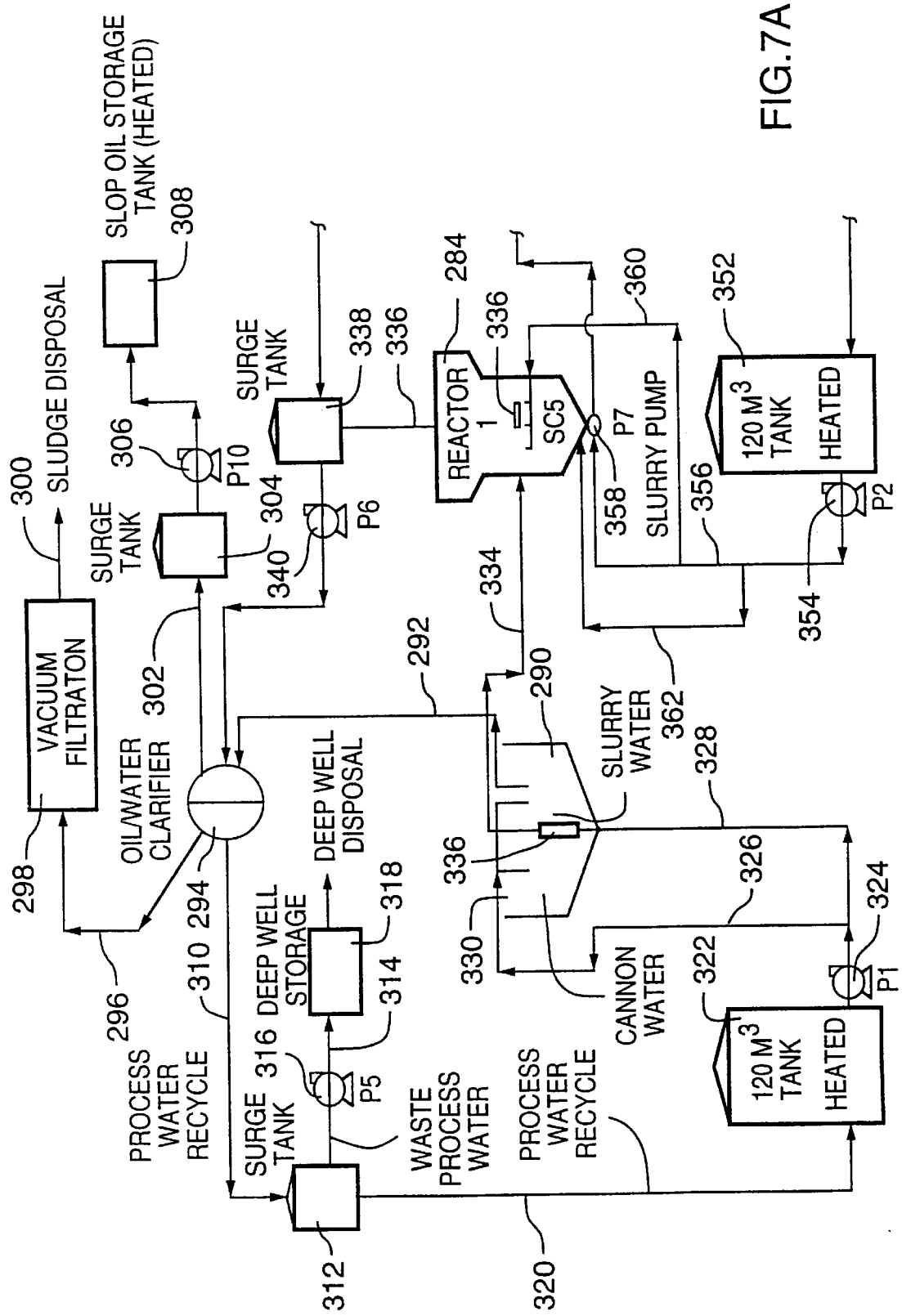
FIG. 7 is a schematic of an alternative embodiment for the processing facility which is particularly adapted to provide counter-current flow of materials and treatment waters.
Figure 7B:
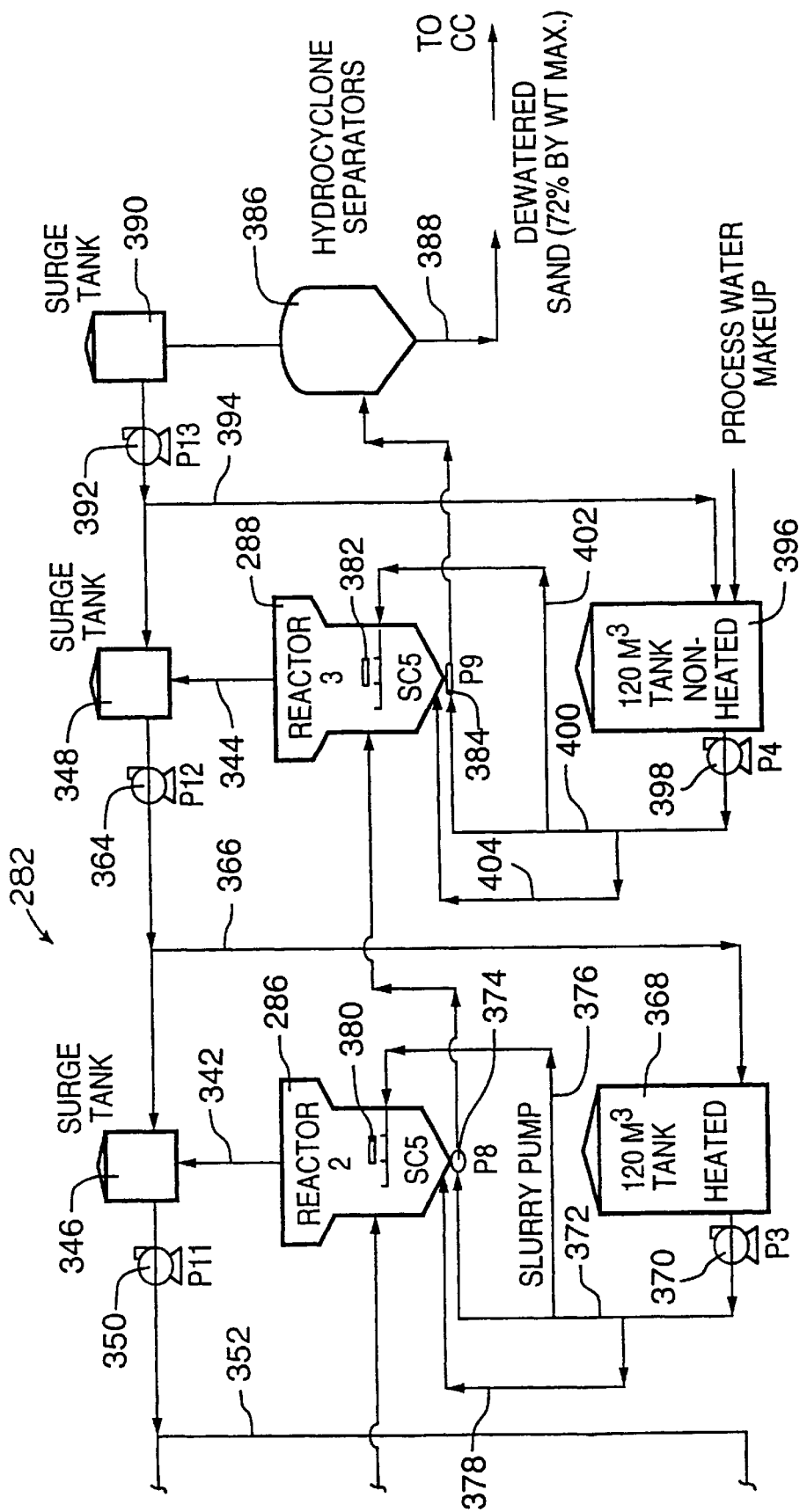

In respect of the processing facility of FIG. 1, the materials to be treated and the processing waters travel concurrently through the system. This approach is more than acceptable when there is a generous supply of fresh water to provide motive power for the jet pump sand transfer devices and for the jet pump scrubbers. This type of cocurrent flows of material and water have a water demand in the range of 3:1 to 4:1 of water to processed sand. However, in installations where fresh water is in tight supply, it is important to conserve on the amount of fresh water used. In accordance with an alternative embodiment of the invention, a countercurrent flow of treatment waters relative to the direction of flow of the process sand provides a water demand of considerably less, usually not exceeding about 1:1. In accordance with a preferred embodiment of the invention, a countercurrent system is shown in FIG. 7. The principle of operation is that the slop oils and water containing increasing concentrations of salts are moved in an upstream direction relative to the downstream direction of flow of the sands being treated through the series of reactors. This countercurrent flow of slop oil and production waters is achieved by providing surge tanks which are connected in series and have pumps for directing the countercurrent flow of production waters to the next upstream reactor primarily for purposes of providing motive power for the jet pump transfer device, but as well to provide elutriation waters for the reactor as well as, if needed, fluidization waters. With reference to FIG. 7, a processing facility generally designated 282 comprises reactors 284, 286 and 288 which are connected in series. The first of the upstream reactors is 284 and the last of the downstream reactors is 288. In advance of the upstream reactor 284, a feed hopper 290 is provided which receives the crude off-loaded materials which usually are washed from trucks by the use of water cannons. Slop oil is removed from the feed hopper 290 and transferred via line 292 to the oil/water clarifier 294. In pumping the sand slurry into the hopper 290, if the quantities are large or if this is the primary method of input for the production sand into the plant, to avoid the excess accumulation of water at the feed hopper and to conserve and recycle the water, it is preferred to dewater the sand slurry prior to the sand being discharged into the feed hopper. The sand may be dewatered by the use of a hydrocyclone separator prior to discharge into the feed hopper, and returning the recovered water to the source of the sand slurry to be recycled as water for transport of more production sand.

The oil/water clarifier transfers the sludge via line 296 to a vacuum filtration device 298 to provide for sludge disposal in line 300. The slop oil is transferred via line 302 to a surge tank 304 and then pumped by pump 306 into a slop oil storage tank 308 which may be heated. The separated process waters are transferred via line 310 to surge tank 312. A portion of the process waters in surge tank 312 are withdrawn in line 314 and pumped by pump 316 into deep well storage 318 for subsequent deep well disposal. The balance of the process waters are transferred via line 320 to storage tank 322 which may be heated. The pump 324 transfers the process waters from tank 322 via lines 326 and 328 either to the water cannon supply system 330 of the clarifier 290, or via line 328 through a jet pump 332 which takes the sand slurry and transfers it via line 334 to the jet pump scrubber 336 located in the reactor 284. The reactors 284, 286 and 288, as mentioned, may be of the same set-up as that shown in FIG. 4. The slop oil from reactor 284 is transferred via line 336 to surge tank 338. Pump 340 transfers the slop oil and process waters from surge tank 338 via line 340 to the oil/water clarifier 294. Similarly, with reactors 286 and 288, the slop oil and process waters are transferred respectively via lines 342 and 344 to surge tanks 346 and 348. Pump 350 transfers the slop oil and process waters from surge tank 346 to surge tank 338. Line 352 removes a portion of those waters and transfers them to tank 352 which is heated to provide the desired temperature of processing waters for reactor 284. Pump 354 pumps the process waters and any slop oil from tank 352 via line 356 to provide motive water for the jet pump 358. In addition, elutriation water is delivered to the reactor 284 via line 360 and fluidization water for the bottom portion of the reactor 284 is delivered via line 362. The function is the same for surge tanks 346 and 348, in delivering the slop oil and process waters countercurrent to the direction of travel of the process sands through reactors 284, 286 and 288. Slop oil and process waters of tank 348 are transferred by pump 364 to surge tank 346. A portion of the slop oil and waters are transferred via line 366 to heated tank 368. Pump 370 provides the motive fluid in line 372 for the jet pump 374 as well as elutriation water in line 376 and fluidization water in line 378. As with reactor 284, jet pump 358 supplies the sand slurry to jet pump scrubber 380 of reactor 286 and similarly, pump 374 provides the slurry to jet pump scrubber 382 of reactor 288. Jet pump 384 transfers the sands from reactor 288 to a solids liquid separator 386. The solids liquid separator may be a hydrocyclone, or other type of separator. Furthermore, reactor 288, that is the most the downstream reactor, may be a clarifier which can be equipped with a sludge collection system. Such clarifiers may be rectangular settling tanks with rectilinear flow and cone bottom hopper for sludge collection. Alternatively, the clarifier may be a center feed settling tank with or without a mechanical breaker arm for sludge collection, or a square settling tank with radial flow in having a cone bottom, or a peripheral feed settling tank with radial flow and cone bottom and or peripheral feed settling tank with spiral flow and cone bottom. The separated solids, which is the purified sand, is removed from the separator 386 via line 388. The sand is dewatered and is ready for disposal or use as a clean sand product which may have secondary uses. The waters and any slop oil remaining is transferred from the hydrocyclone separator 386 to the surge tank 390. Pump 392 transfers the process waters to surge tank 348 and a portion of which is delivered in line 394 to the heated tank 396. Pump 398 delivers the motive liquid in line 400 to the jet pump transfer device 384. Line 402 delivers the elutriation water to the reactor 288 and line 404 delivers the fluidization water to reactor 288.

Figure 8:
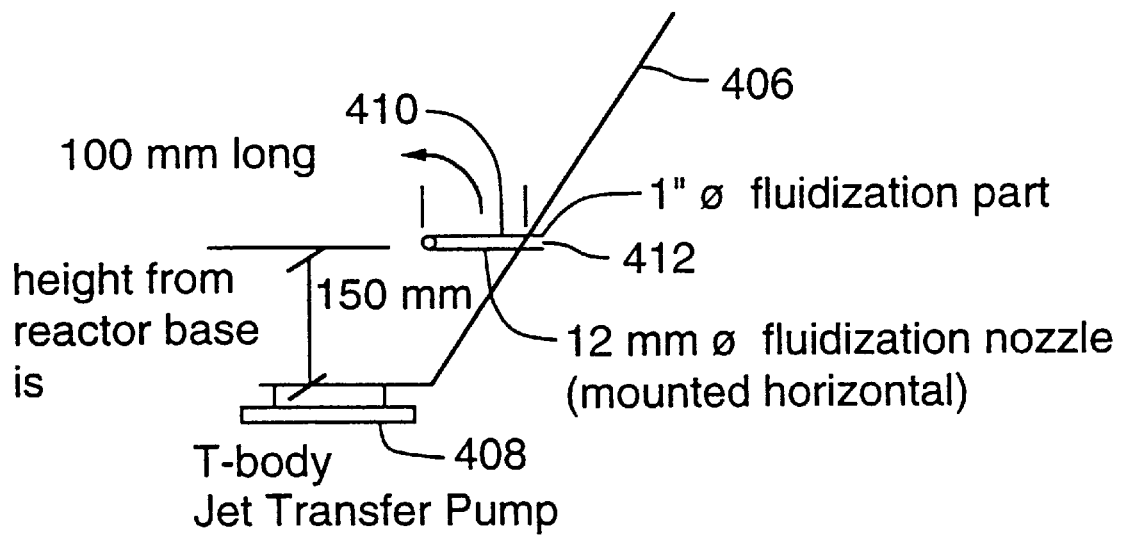
FIG. 8 is a section through the bottom of the reactor of FIG. 4 showing the location of fluidization ports.

With reference to FIG. 8, in order to assist in the transfer of the sand slurry from the base of each reactor to the next reactor, or to the solid liquid separator, the base of the reactor includes fluidization ports. As shown in FIG. 8, the lower portion of the representative reactor or cone bottom clarifier is 406. The outlet 408 is provided at the base of the cone. In order to fluidize the sand settling in the bottom portion 406, tubes 410 are located about the circumference of the bottom portion 406. The fluidization waters enter the fluidization ports 412 to stir up and fluidize the sand in the lower portion of the cone 406. This fluidization of the sands ensures a mixed slurry which can be readily transferred from the outlet 408 by a jet transfer pump or the like to the next reactor or to the solid liquid separator. For example, in place of the jet transfer pump, it is understood that other types of slurry pumps may be used, such as a Discflow® pump. These pumps are readily available in the marketplace; for example, as sold by Discflow Corporation. The jet flow pump and the Discflow pumps are capable of transporting percent solids of 20% or greater. The Discflow pumps are capable of transporting solid concentrations as high as 50%. The fluidization ports are preferably located opposite one another about the base of the reactor. For a four-sided cone bottom, it is usually only necessary to have one fluidization port per side. Valves or the like may be provided in the respective fluidization lines for the reactors 284, 286 and 288 to control the extent of fluidization of the sands in the base of the respective reactor.

As previously discussed, the processing facility of this invention is capable of producing solids, particularly sands, having minimal impurities and which are capable of meeting the requirements of Table I. These requirements are of the highest standard and provide a processed sand which is suitable for use in a variety of value added products which require clean sand. Sand recovered by this process has sufficient purity to be used as fillers, extenders, reinforcing materials, thickeners for liquid systems, thixotropic agents, flattening agents and abrasives. With additional treatment of the sand to increase silicon dioxide purity above 99%, the sands may then be used in semi-conductor manufacture. There are, however, other situations where the sand does not have to be as clean; for example, there are other levels of sand quality as established by the Alberta Environmental Protection Agency (AEP). The Tier one criteria for sand need only meet the following parameters as set out in Table II.

TABLE II

| PARAMETERS | VALUE |
| --- | --- |
| Mineral oil and grease | < or equal to 1000 milligrams/kilogram |
| pH | 6 to 8.5 |
| Electrical conductivity | < or equal to 2 $dSm^{-1}$ |
| Sodium adsorption | ratio < or equal to 6 |

Figure 9:
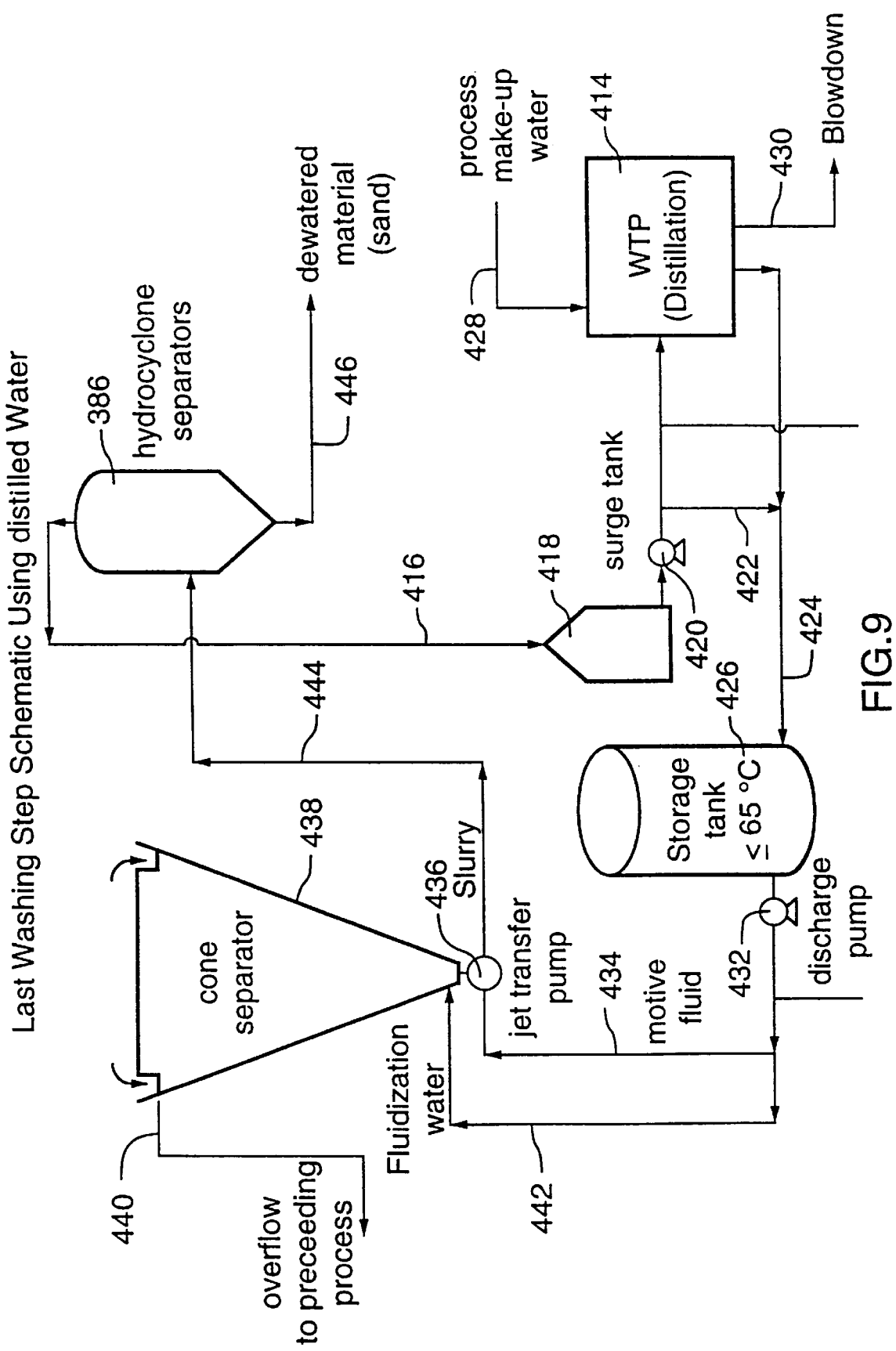
FIG. 9 is a schematic of production water treatment system.

This Tier one quality of sand may be acceptable for certain value added products. In meeting this less strict criteria for impurities in the sand, the selected temperature for operating the jet pump scrubber may be lowered. Instead of operating in the range of 80° C. and higher to achieve sand qualities of Table I, one is able to achieve the sand qualities of Table II with a jet pump scrubber temperature in the range of 65° C. This reduces the energy costs in operating the process facility when a Tier one type sand is acceptable. Experimental work has demonstrated that the efficiencies of the scrubber may be varied to suit particular needs in the treatment system. The parameters which may be adjusted include temperature of the scrubber system, jet pump scrubber pressure, elutriation water temperature, extent of turbulence in the jet pump scrubber and feed rate. As already noted above, to achieve acceptable rates of removal of oily films from the sand particles, the scrubber temperature and elutriation water temperatures should be in excess of 65° C. To provide for optimum removal of the oily films from the particles, the temperature should be in excess of 80° C. The jet pump scrubber pressure is preferably in the range of 95 psi to 110 psi. Such pressures result in Reynolds numbers for the fluid in the jet pump scrubber in the range of 2 to 4 times $10^6$. At these operating conditions, the feed rate is normally in the range of about 1.5 $m^3$ per hour to about 3.0 $m^3$ per hour with an average preferred feed rate of about 2 $m^2$ per hour. These feed rates involve percent solids in the range of about 40 to 85%, depending upon the limitations for the transfer pumps from one jet pump scrubber system to the next.

Where it is desired to reduce fresh water demands and to reuse the process waters, a water treatment system of the type shown in FIG. 9 may be employed. The water treatment system has a water purification unit 414 which removes from the process waters various impurities, including the high salt loadings. The process waters are obtained from the solid liquid separator 386 which may be the same as the separator for FIG. 7. The process waters are transferred via line 416 to a surge tank 418. The pump 420 transfers the process waters to the water purification unit 414. The process waters may be diverted via line 422 to line 424. Otherwise the process waters are fed to the purification unit 414 which may be a microfiltration-reverse osmosis unit, or a distillation unit. The fresh waters are transferred via line 424 to surge tank 426. Make-up water is also added to the water purification unit 414 via line 428. The amount of make-up water compensates for water losses throughout the system, particularly water which is transferred for deep well disposal from storage tank 318. The water purification unit has a sludge or bottom disposal line 430. This material may be recirculated or disposed of as needed. The storage tank 426 may be heated to the necessary temperature. Pump 432 provides the necessary motive fluid in line 434 for the jet transfer pump 436. The jet transfer pump 436 removes the sands from the base of the cone separator 438. The separator 438 may be any of the aforementioned type of water clarifiers or separators. The overflow from the cone separator proceeds via line 440 to the appropriate surge tank upstream of the processing facility to provide countercurrent flow of the slop oil and process waters. Pump 432 also provides as needed fluidization water in line 442. The jet transfer pump 436 transfers the sand slurry via line 444 to the separator 386. The separated sand is delivered via line 446 to a dewatering system to provide the evaluated sand product. This water treatment system provides a very efficient effective device in supplying fresh water to the reactor series to optimize separation of the oily films from the sand particles.

Figure 10:
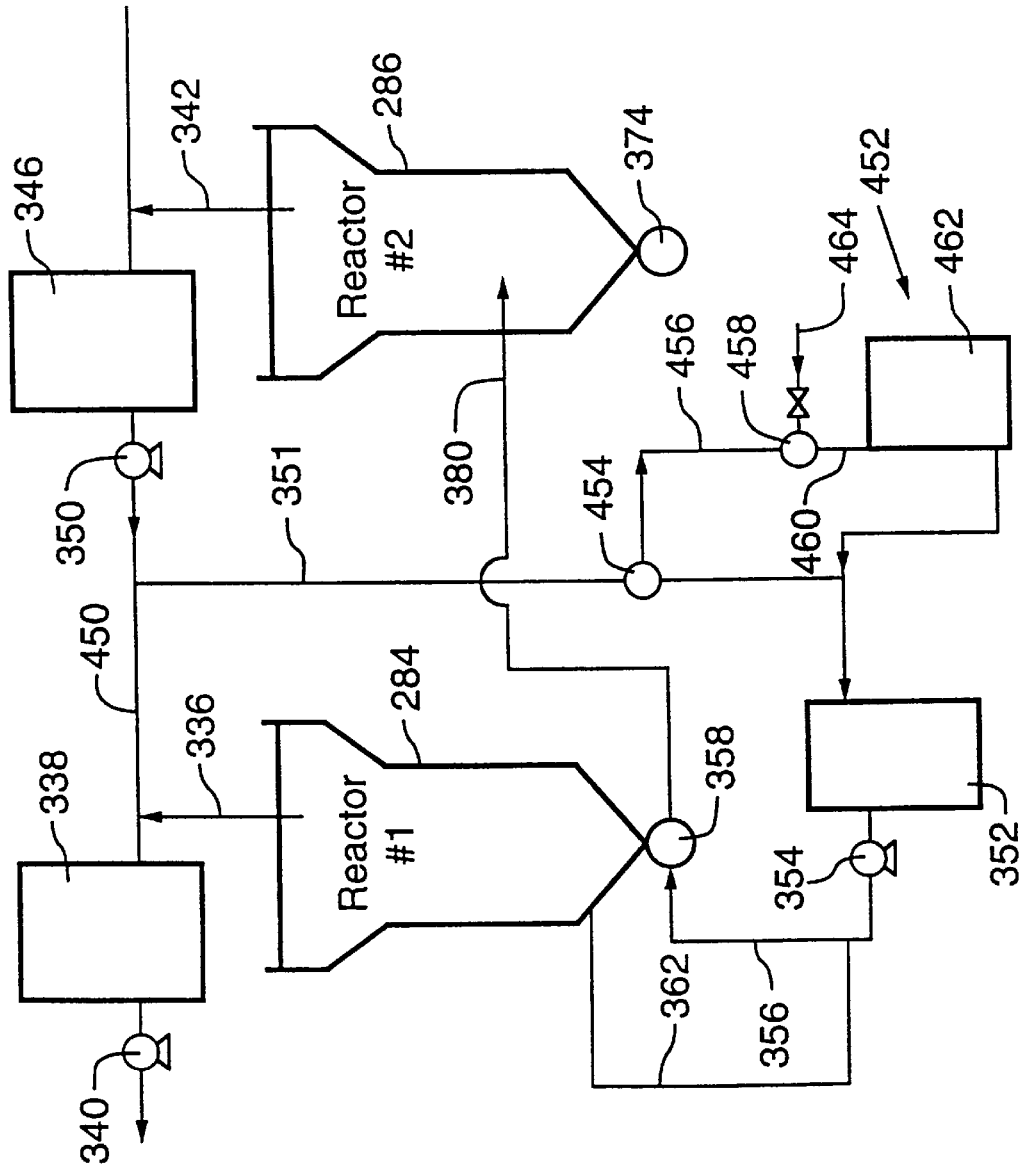
FIG. 10 is a schematic of production water ancillary treatment system to remove salt loading.

An additional aspect of the water treatment system, which may be used in conjunction with the water purification system to control salt loadings in the process waters, is shown and described with respect to FIG. 10. Reactors 1 and 2 of FIG. 7 are shown in FIG. 10 in order to reduce the salt loading transferred in line 450 between surge tanks 346 and 338. A salt removal system 452 is provided in parallel line 351 which supplies process waters to heated tank 352. It is appreciated that the salt treatment system 452 may be incorporated in the supply lines to each of the tanks 322, 352, 368 and 396. Line 351 incorporates a valve 454 which removes a portion of the process waters flowing through to heated storage tank 352. The portion of the process waters removed at valve 454 flows through line 456. An injection port is provided at 458 to facilitate injection of a chelator-type agent for the sodium chloride salt in line 351. The preferred agent is a modified sodium silicate which forms a semi-colloidal/precipitate in line 460 before entry to the precipitate treatment device 462. The sodium silicate reacts with the sodium chloride salt to form this precipitate with a size which can be readily filtered by the use of a suitable filtration medium, preferably a carbonaceous material derived from sugar cane. The sodium silicate is introduced through line 464 in the amount is metered dependent upon the salt concentration, flow rate and reaction time required before removal from device 462. It is appreciate that other types of filtration medium may be used in device 462, although the carbonaceous material derived from sugar cane is preferred. Other types of filter media include fine sand filtration or granular-activated carbon. It is also preferred that in line 351 an oil separator is used to remove from the slip stream in line 456 to reduce oil concentration to less than 5 ppm rather than loosing the oil to the filtration medium.

The filtration medium in device 462 may be renewed periodically by extracting a small fraction of the filtration material and adding a fresh supply of the filtration material. The sugar cane material appears to work best in capturing the sodium silicate salt precipitate by virtue of its ability to capture the precipitate by screening, by impact, by electrostatic interaction and by specific adsoprtion. Depending upon the salt concentrations in line 351, the salt removal system 452 is capable of reducing salt loadings from about 10,000 ml per liter to less than 500 ml per liter of sodium chloride. The supplementary salt treatment system considerably reduced the burden placed on the water treatment system described with respect to FIG. 9.

The varous embodiments of the invention demonstrate the various aspects in the application of the invention. It is appreciated that operation of the various embodiments may be at lest partly or totally controlled by programmable electronic equipment. The following logic diagrams demonstrate the logic as per preferred aspects of the invention for operating the equipment.

Figure 11A:
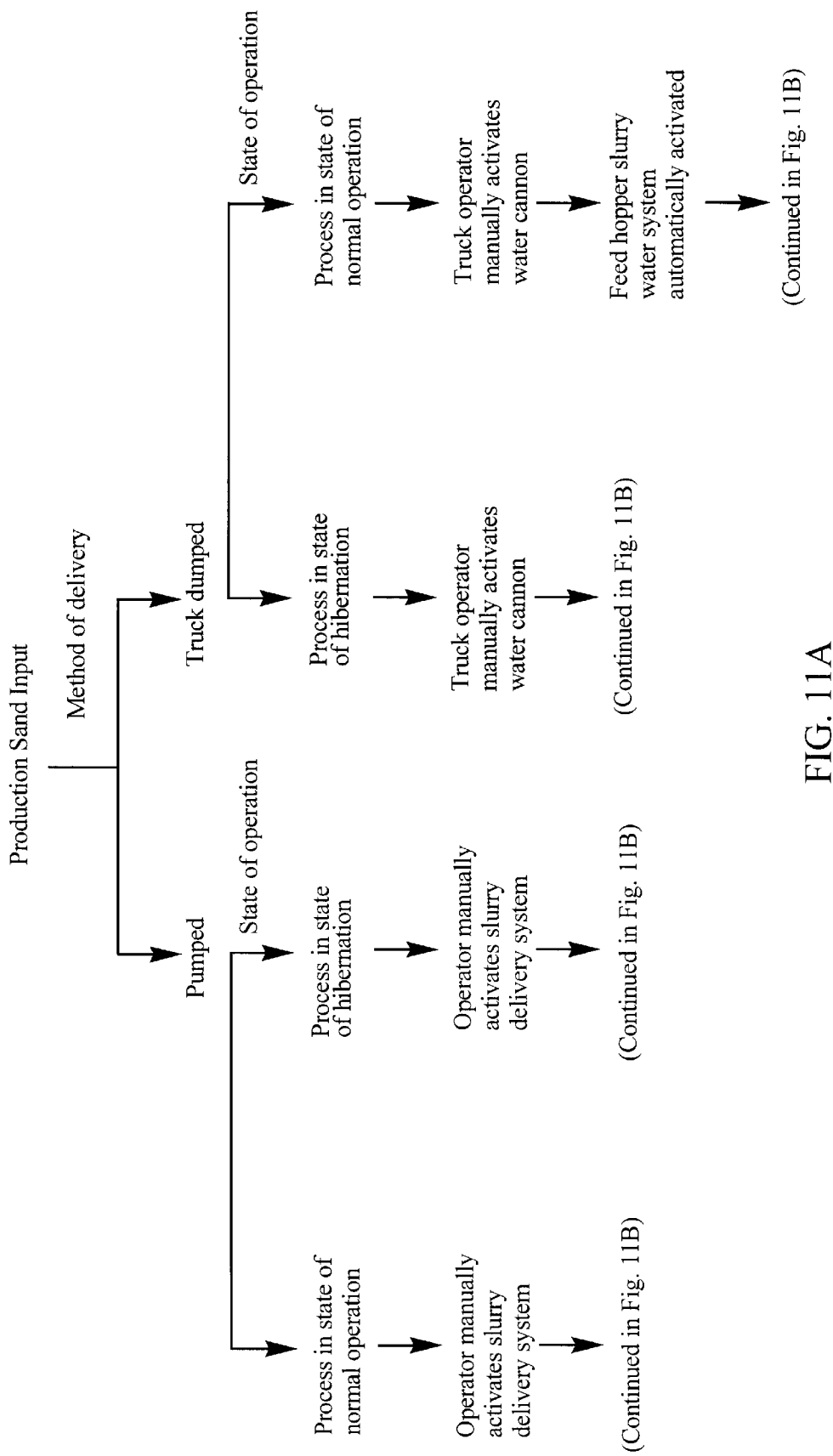
FIGS. 11A and 11B are logical process diagram for a sand delivery system to a plant in accordance with the present invention.
Figure 11B:
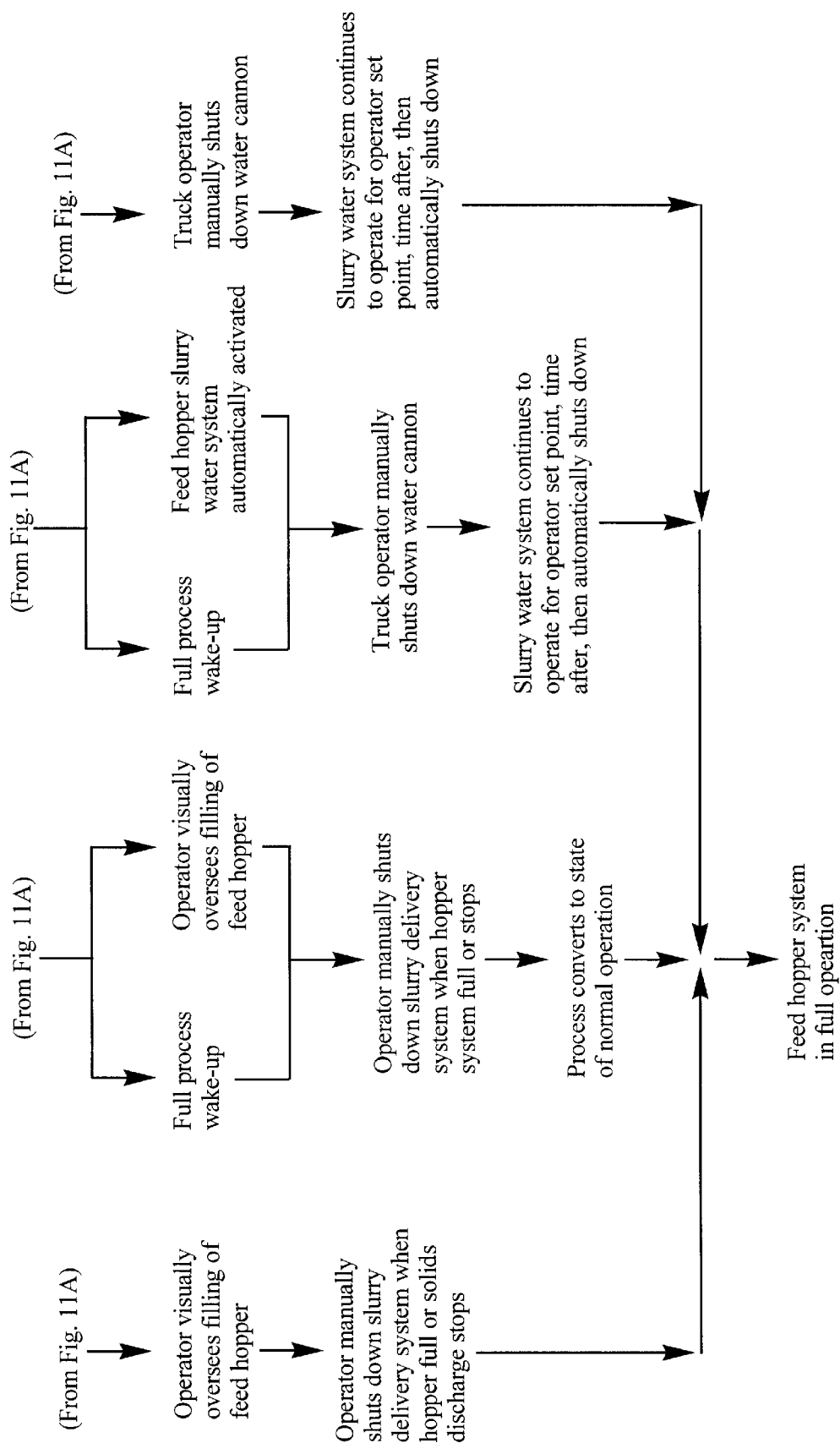
Figure 12:
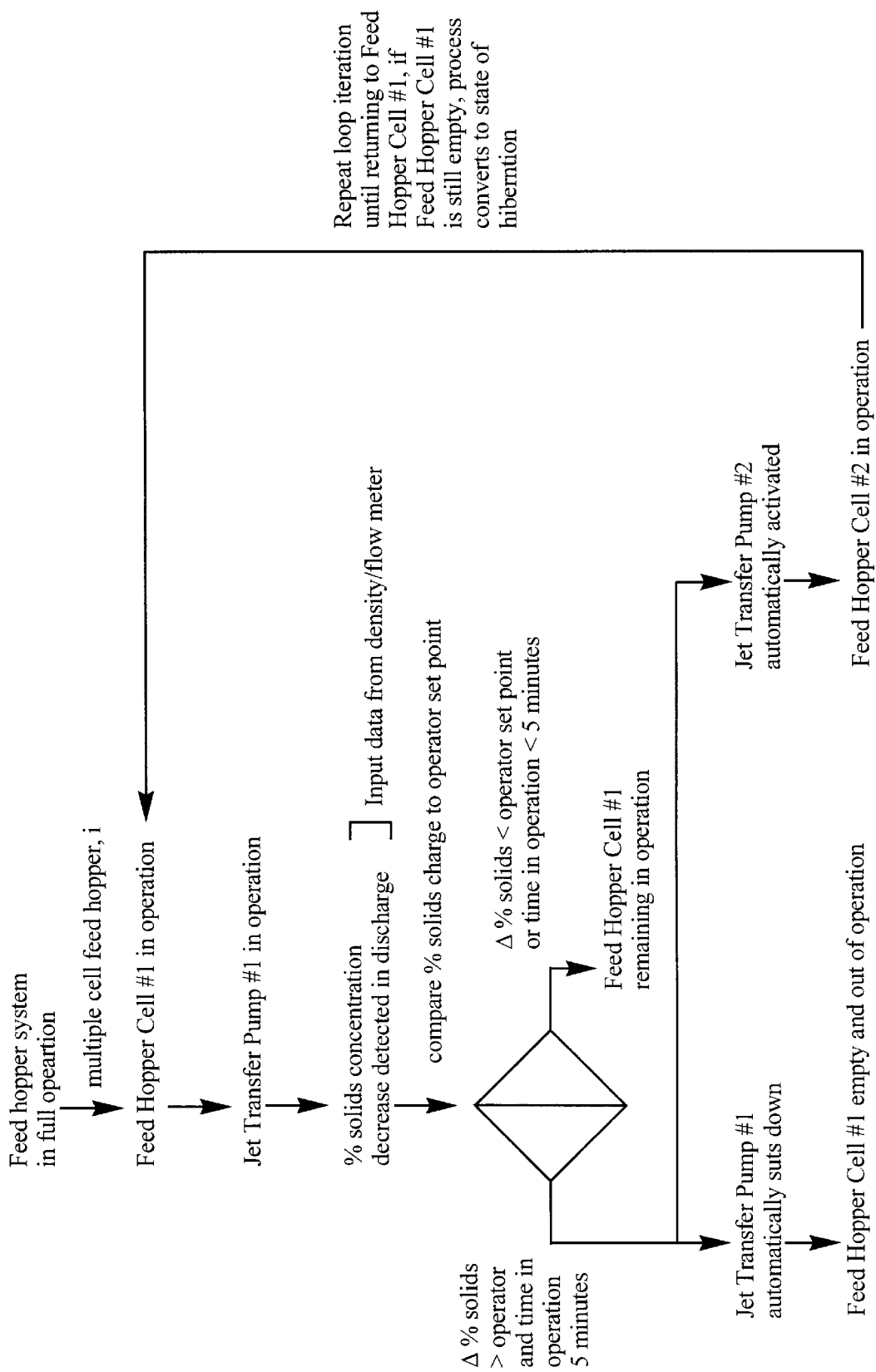
Figure 13A:
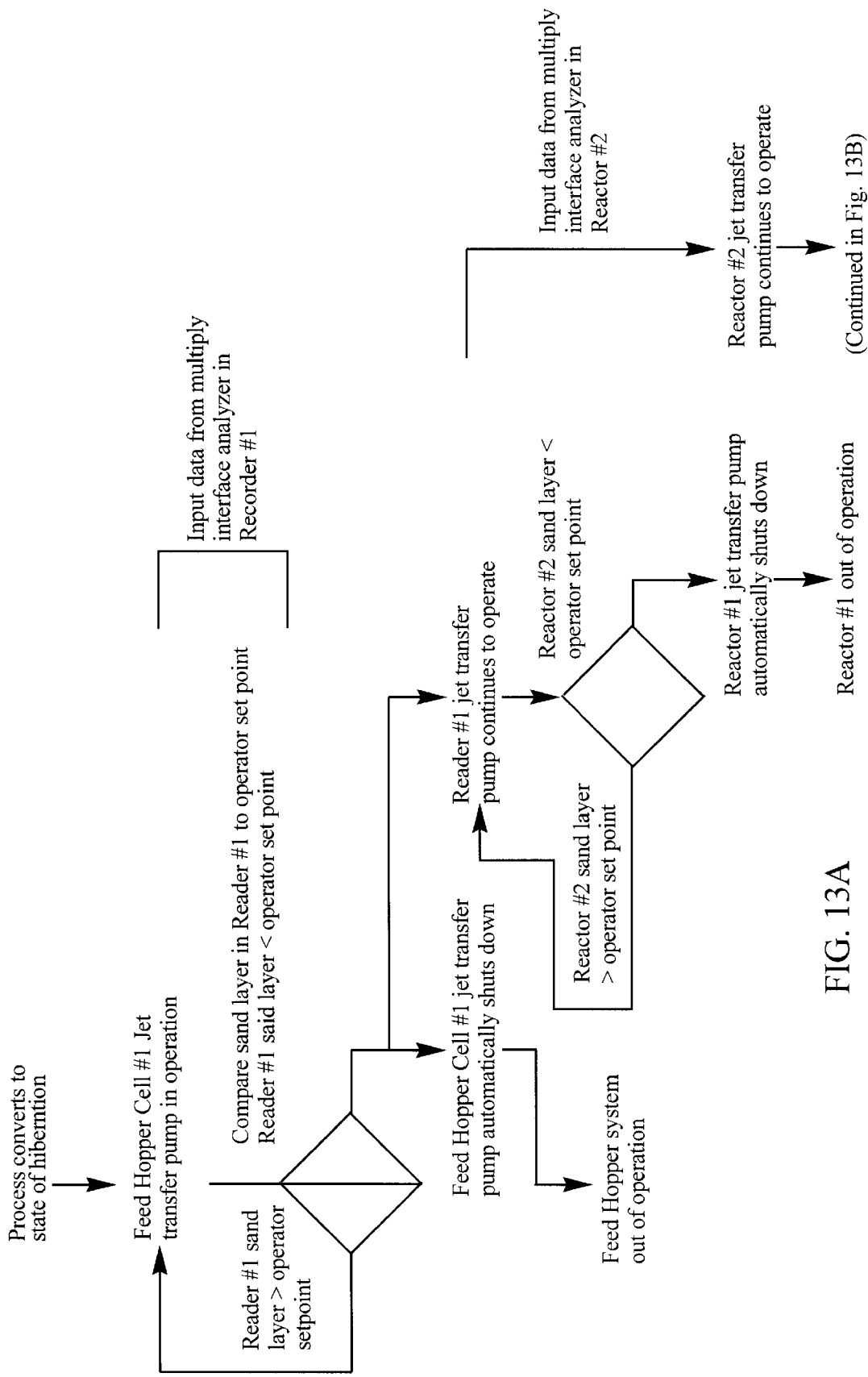
FIGS. 13A and 13B are a logical process diagram for converting the process to a state of hibernation.
Figure 13B:
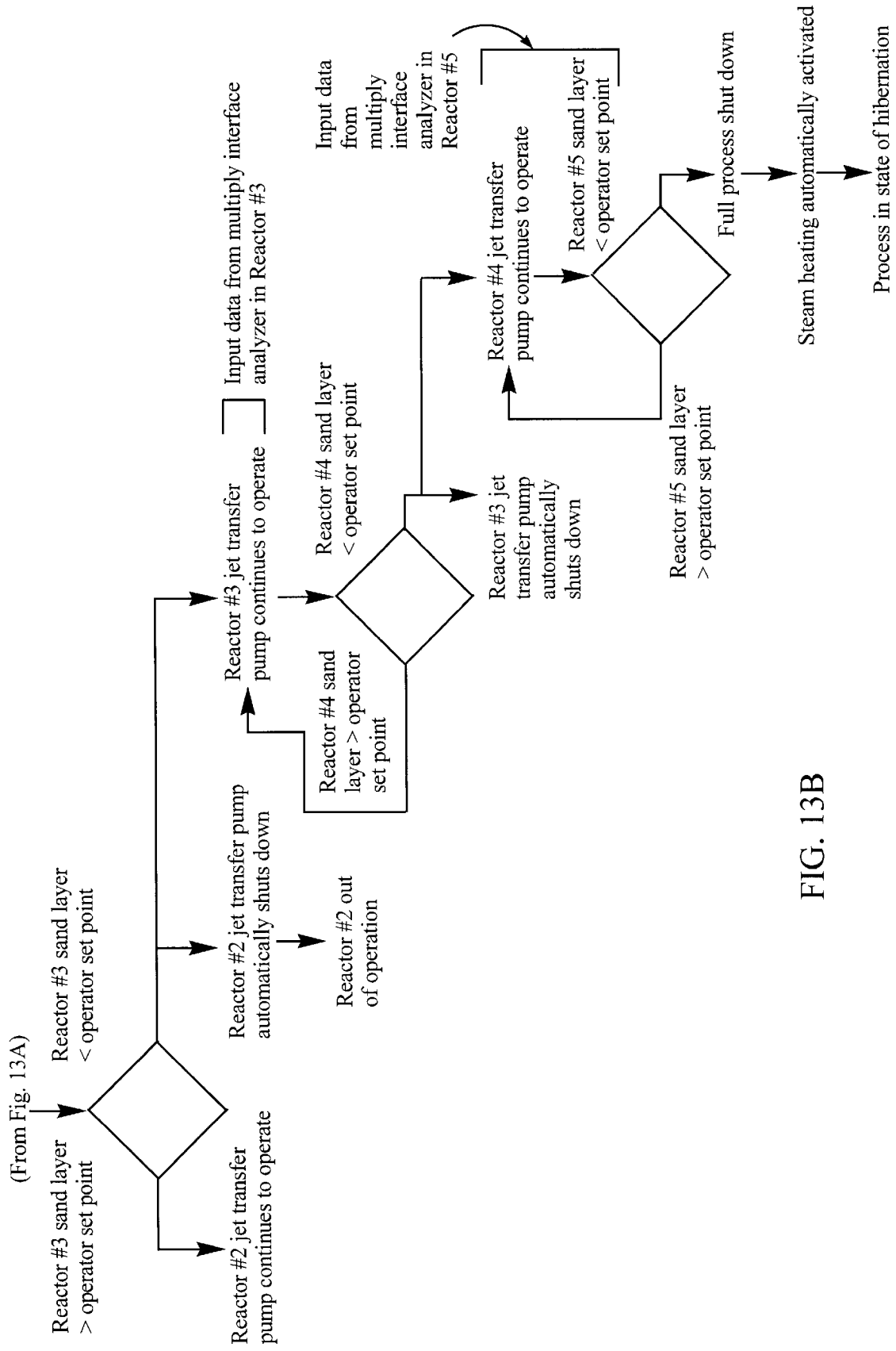
Figure 14:
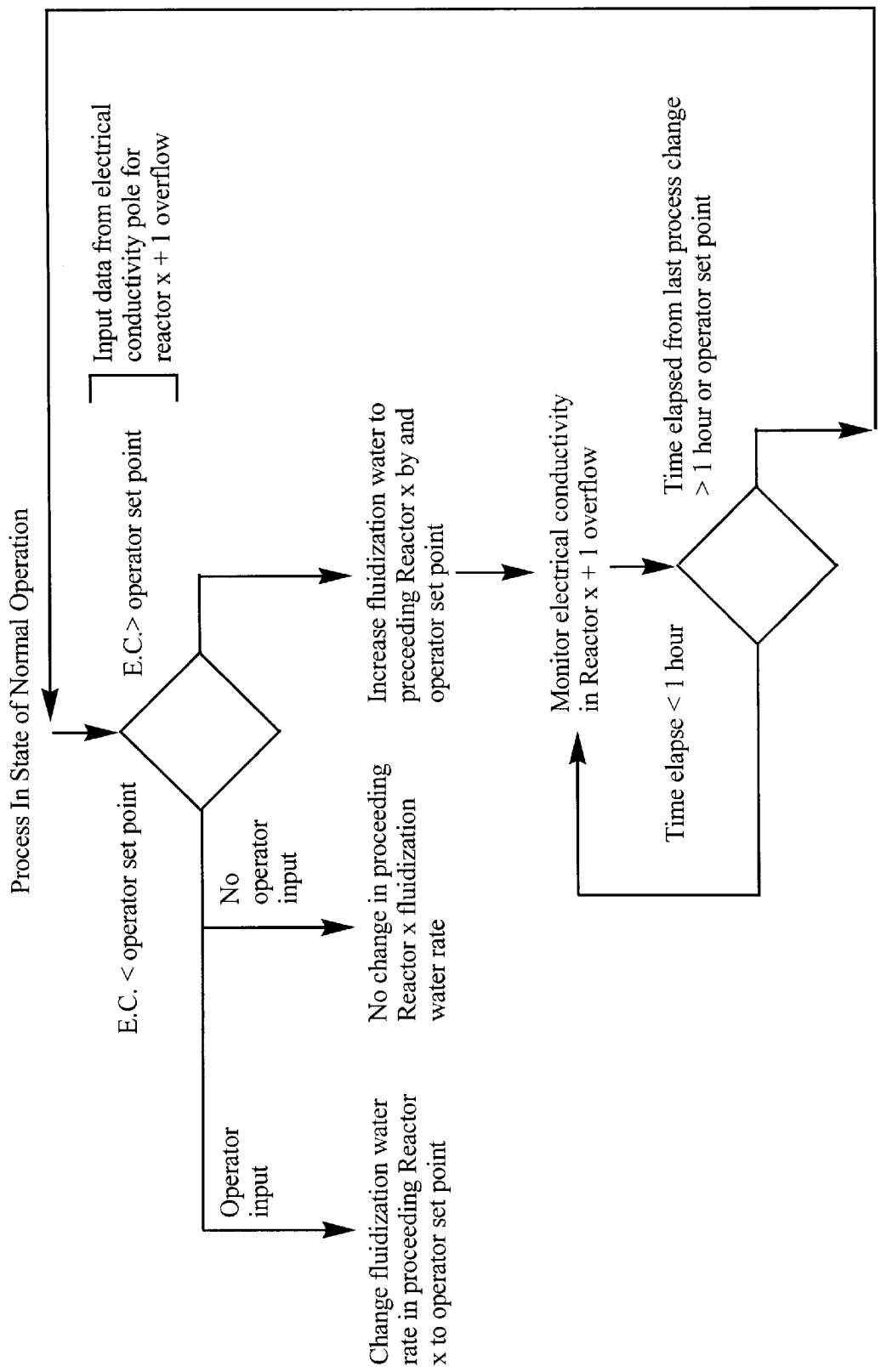
FIG. 14 is a logical process diagram for control of salt contamination from one reactor to another.
Figure 15A:
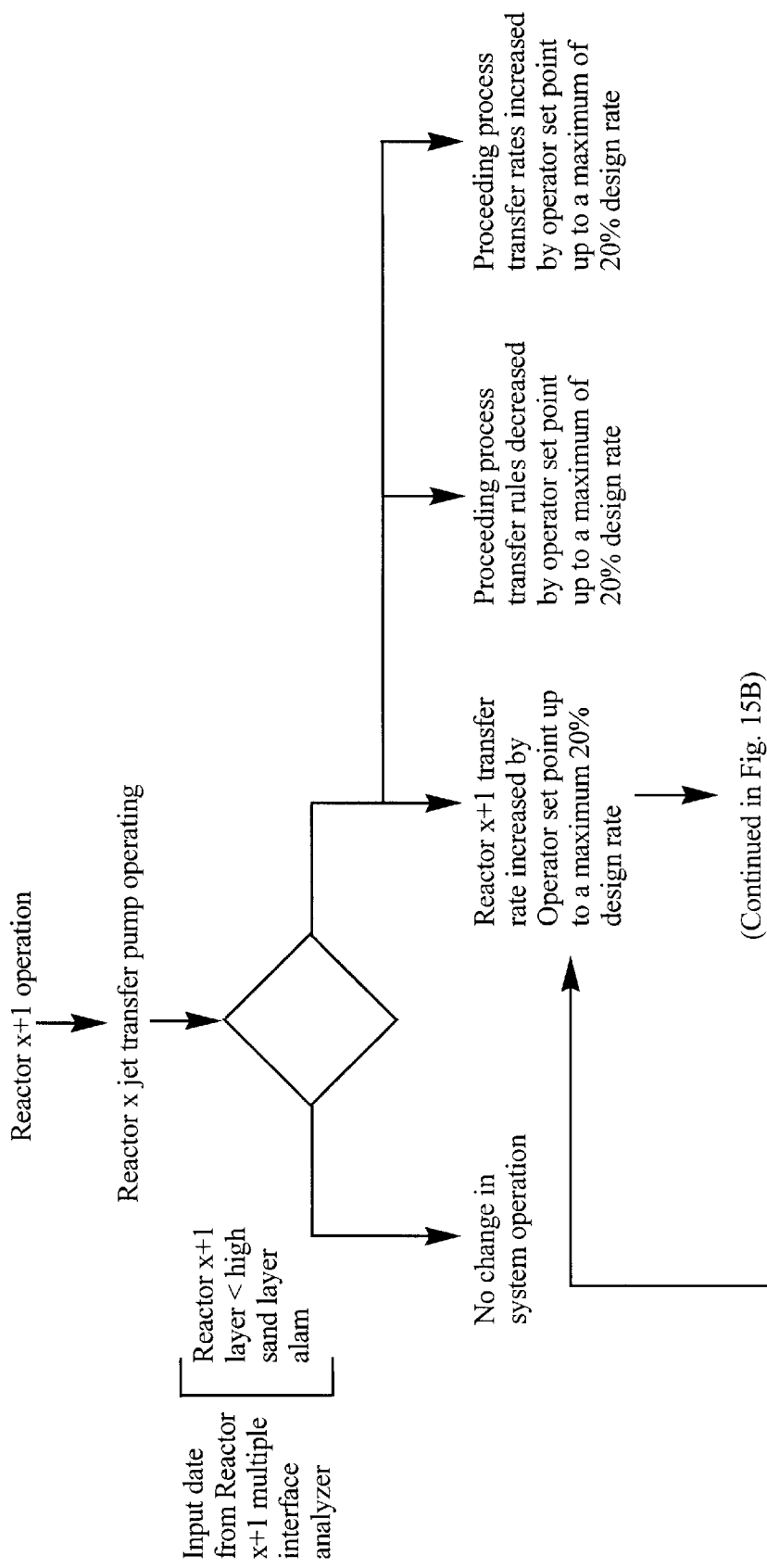
FIGS. 15A and 15B are a logical process diagram for sand layer control in a typical reactor.
Figure 15B:
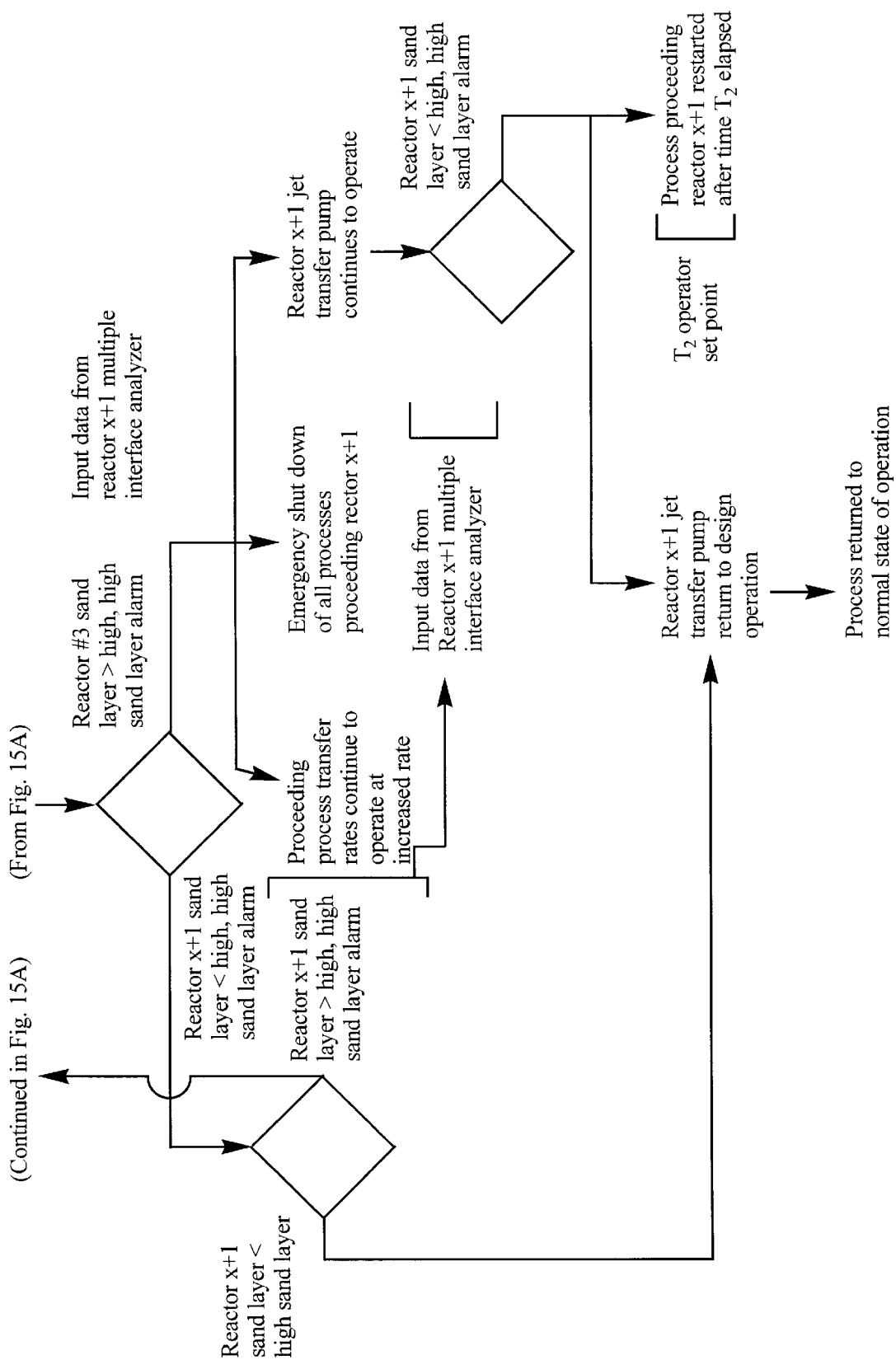

FIGS. 11A–15B are logical flow diagrams of the logic governing operation of the equipment described above. More particularly, FIGS. 11A and 11B are a logical process diagram for a sand delivery system to a plant in accordance with the present invention. FIGS. 13A and 13B are a logical process diagram for converting the process to a state of hibernation. FIG. 14 is a logical process diagram for control of salt contamination from one reactor to another. FIGS. 15A and 15B are a logical process diagram for sand layer control in a typical reactor.

Although preferred embodiments of the invention have been described herein in detail, it will be appreciated by those skilled in the art that variations may be made thereto without departing from the spirit of the invention or scope of the appended claims.

I claim:

1. In a process for separating oily films from sand particles carried in a solvent free water medium, using a jet pump scrubber in a density classification tank to treat such oily coated particles at controlled operating temperatures for said medium at about above 65° C. whereby at such controlled temperature enhanced cavitation in said jet pump separates said oily film from said sand particles to form slop oil, said tank providing for recirculation of sand particles through said jet pump before discharge.

2. In a process of claim 1, said controlled operating temperature ranges from about 80° C. to about boiling temperature of said medium.

3. In a process of claim 2, said jet pump scrubber comprises a jet nozzle, scrubber chamber and a target, said water stream carrying incoming sand particles to be treated being forced through said jet nozzle at high velocity toward an entrance to said scrubber chamber, said high velocity jet drawing surrounding water and treated sand particles at said operating temperature into said scrubber chamber, said water at operating temperature expediting formation of water vapor bubbles at sand particle surfaces which implode rapidly during enhanced water cavitation occurring in said scrubber chamber, said rapid bubble implosion removing oily film from said particles.

4. In a process of claim 3, wherein a jet pump delivers said water stream and incoming sand particles to said jet nozzle of said jet pump scrubber.

5. In a process of claim 3 said tank comprises vertical mid-section, a converging bottom section and a divergent upper section, said jet pump scrubber being positioned in said mid-section adjacent said bottom section and extending transversely of said tank with said target located beyond said scrubber chamber, said jet stream drawing in surrounding water and already treated sand particles, water and separated oily film flowing upwardly from said target and sand particles falling downwardly toward said bottom section, upwardly flowing water and slop oil separating in said divergent upper section wherein upward flow velocities decrease, means for injecting air bubbles into said divergent upper section to float slop oil which is removed along with water by an upper weir and means for fluidizing sand in said bottom section.

6. In a process of claim 1 for treating production sands derived from heavy oil production.

7. In a process of claim 6, using at least two tanks with respective jet pump scrubbers, extracting sand from said bottom section of said first tank and introducing it to said jet pump scrubber in said second tank.

8. In a process of claim 7, using a jet pump or disk flow pump to transport said sand extracted from said first tank to said second tank and means for fluidizing sand in said bottom section.

9. In a process of claim 6, said tank having means for injecting a heated aqueous medium in the region of said jet pump scrubber, said heated aqueous medium maintaining a temperature gradient upwardly of said tank to enhance separation of slop oil from said water and separation of sand particles with oily coating from sand particles with less oily coating.

10. In a process of claim 9, said tank comprises a vertical mid-section, a converging bottom section and a divergent upper section said jet pump scrubber being positioned in said mid-section adjacent said bottom section and extending transversely of said tank with said target located beyond said scrubber chamber, said jet stream drawing in surrounding water and already treated sand particles, water and separated oily film flowing upwardly from said target and sand particles falling downwardly toward said bottom section, upwardly flowing water and slop oil separating in said divergent upper section wherein upward flow velocities decrease, means for injecting air bubbles into said divergent upper section to float slop oil which is removed along with water by an upper weir and means for fluidizing sand in said bottom section.

11. In a process of claim 10, measuring differential pressure between tank positions in said mid-section above and adjacent said heated medium introducing means and in said bottom section, means for controlling said heated medium introducing means to control volume of introduced medium and maintain thereby a density gradient as determined by measured differential pressure to separate based on said defined density gradient treated sands from said separated oily film.

12. In a process of claim 11, said medium being steam, hot water or a combination.

13. In a process of claim 12, measuring temperature of tank contents at selected vertical tank positions, said control means adjusting medium introduction to maintain said temperature while maintaining said density gradient.

14. In a process of claim 7 wherein said first tank is operated at an acidic pH and said second tank is operated at a basic pH.

* * * * *